US009507633B2

(12) United States Patent
Kurihara et al.

(10) Patent No.: US 9,507,633 B2
(45) Date of Patent: Nov. 29, 2016

(54) SCHEDULING METHOD AND SYSTEM

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Naoki Odate, Akiruno (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 14/134,643

(22) Filed: Dec. 19, 2013

(65) Prior Publication Data
US 2014/0109100 A1 Apr. 17, 2014

Related U.S. Application Data

(63) Continuation of application No. PCT/JP2011/064841, filed on Jun. 28, 2011.

(51) Int. Cl.
G06F 9/54 (2006.01)
G06F 9/48 (2006.01)
G06F 13/16 (2006.01)
G06F 9/52 (2006.01)
G06F 3/06 (2006.01)

(52) U.S. Cl.
CPC .............. G06F 9/4881 (2013.01); G06F 9/52 (2013.01); G06F 13/1663 (2013.01); G06F 3/0631 (2013.01)

(58) Field of Classification Search
CPC .... G06F 9/4881; G06F 9/52; G06F 13/1663; G06F 3/0631
See application file for complete search history.

(56) References Cited

U.S. PATENT DOCUMENTS

| 6,021,464 A | 2/2000 | Yao et al. |
| 6,256,704 B1 | 7/2001 | Hlava et al. |
| 7,330,930 B1* | 2/2008 | Nagshain ............ G06F 3/0611 711/112 |
| 2003/0088608 A1* | 5/2003 | McDonald ........... G06F 9/4881 718/106 |
| 2007/0220514 A1 | 9/2007 | Sugimoto et al. |
| 2007/0250604 A1* | 10/2007 | Wu ...................... H04L 12/00 709/220 |
| 2008/0244587 A1* | 10/2008 | Li ......................... G06F 9/3836 718/102 |
| 2009/0083744 A1* | 3/2009 | Shimada .............. G06F 9/4843 718/102 |
| 2010/0250874 A1* | 9/2010 | Farrell ................ G06F 13/161 711/155 |

FOREIGN PATENT DOCUMENTS

| JP | 3-18976 | 1/1991 |
| JP | 7-104939 | 4/1995 |
| JP | 10-91357 | 4/1998 |
| JP | 2007-249729 | 9/2007 |
| JP | 2009-187327 | 8/2009 |

OTHER PUBLICATIONS

Office Action mailed Apr. 7, 2015 for corresponding Japanese Patent Application No. 2013-522397.
PCT International Preliminary Report on Patentability mailed Jan. 16, 2014 in corresponding International Application No. PCT/JP2011/064841.
International Search Report mailed Sep. 27, 2011 in corresponding International Application No. PCT/JP2011/064841.

* cited by examiner

Primary Examiner — Syed Roni
(74) Attorney, Agent, or Firm — Staas & Halsey LLP

(57) ABSTRACT

A scheduling method that is executed by a first central processing unit (CPU) includes determining whether a task belongs to a first task category; determining whether a first access area accessed by the task is located in a first memory or a second memory, when the task belongs to the first task category; and setting a memory accessed by the task to the first memory or the second memory, based on a result at the determining.

12 Claims, 27 Drawing Sheets

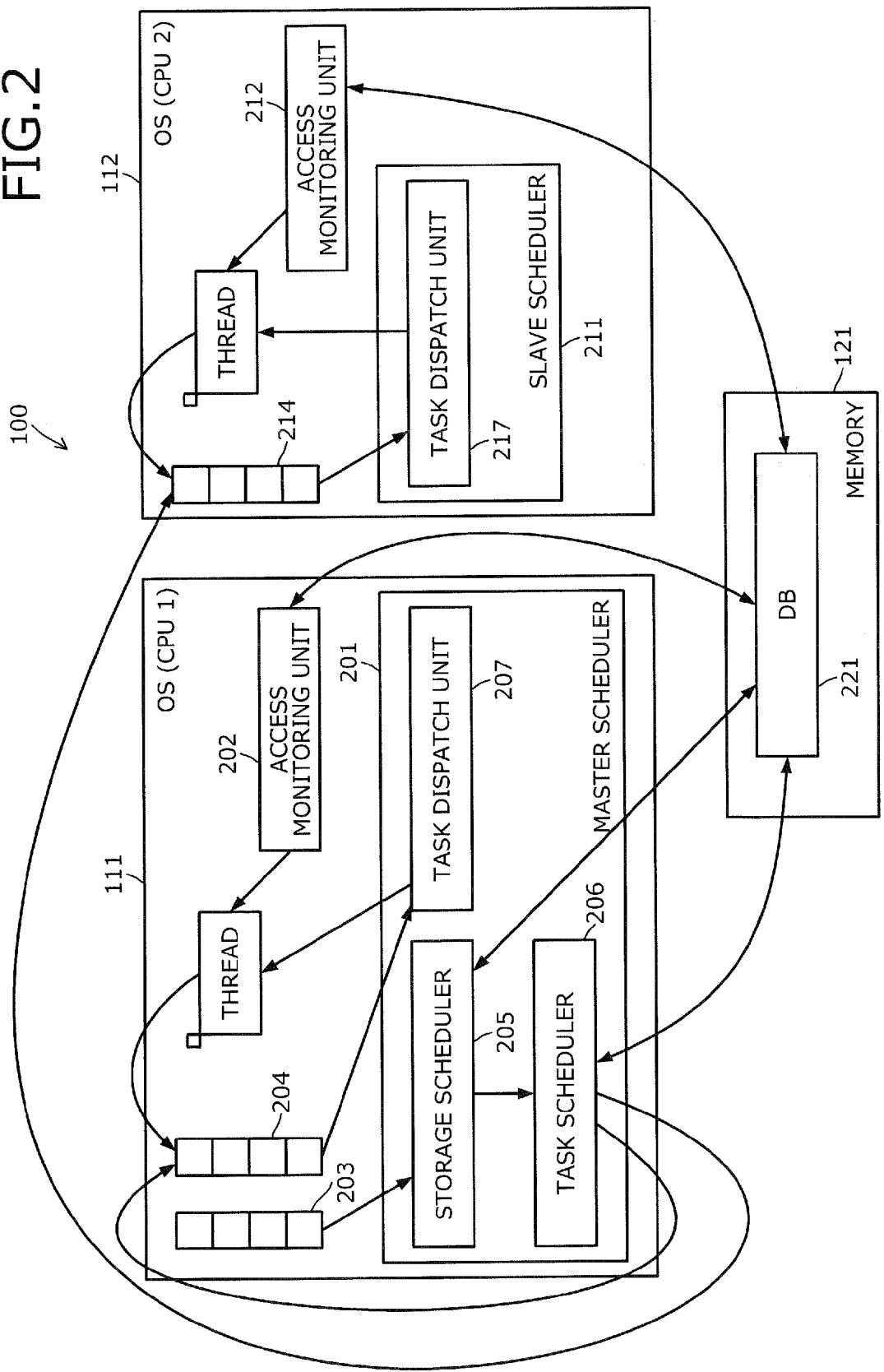

FIG.3A

TASK TABLE 301

WRITE TASK TABLE 311
- (1) WRITE TASK ID
- (2) SPECIFIED WRITE AREA
- (3) WRITE SPECIFIED AREA
- (4) WRITE-BACK DETERMINATION FLAG
- (5) TEMPORARY STORAGE DESTINATION ACCESS READ TASK
- (6) DATA SIZE

READ TASK TABLE 312
- (1) READ TASK ID
- (2) SPECIFIED ACCESS AREA
- (3) READ SPECIFIED AREA
- (4) DATA SIZE

F-TASK TABLE 313
- (1) F-TASK ID
- (2) WRITE-BACK WRITE TASK ID

FIG.3B

STORAGE ACCESS SCHEDULING TABLE　321

| (1) STORAGE ID | STORAGE A | STORAGE B | ... |
|---|---|---|---|
| (2) ALLOCATED TASK ID | | | |
| (3) ESTIMATED END TIME | | | |

TASK SCHEDULING TABLE　322

| (1) CPU ID | CPU 1 | CPU 2 | ... |
|---|---|---|---|
| (2) ALLOCATED TASK ID | | | |

FIG.3C

| CATEGORY | ACCESS TYPE | BANDWIDTH UTILIZATION | APP EXAMPLE | PROCESSING TIME |
|---|---|---|---|---|
| A | Read | CONSTANT BANDWIDTH | VIDEO, NAVIGATION | SIZE DEPENDENT |
| B | Read | ENTIRE BAND WIDTH (AS MUCH AS POSSIBLE) | UPLOAD | SIZE DEPENDENT |
| C | Write | ENTIRE BAND WIDTH (AS MUCH AS POSSIBLE) | DOWNLOAD | SIZE DEPENDENT |
| D | Write | TOP PRIORITY | SWAP-OUT | MOMENTARY |
| E | Read | TOP PRIORITY | SWAP-IN | MOMENTARY |
| F | Read and Write | ENTIRE BAND WIDTH (AS MUCH AS POSSIBLE) | WRITE-BACK FROM SUB-DISK TO MAIN DISK | SIZE DEPENDENT |

331

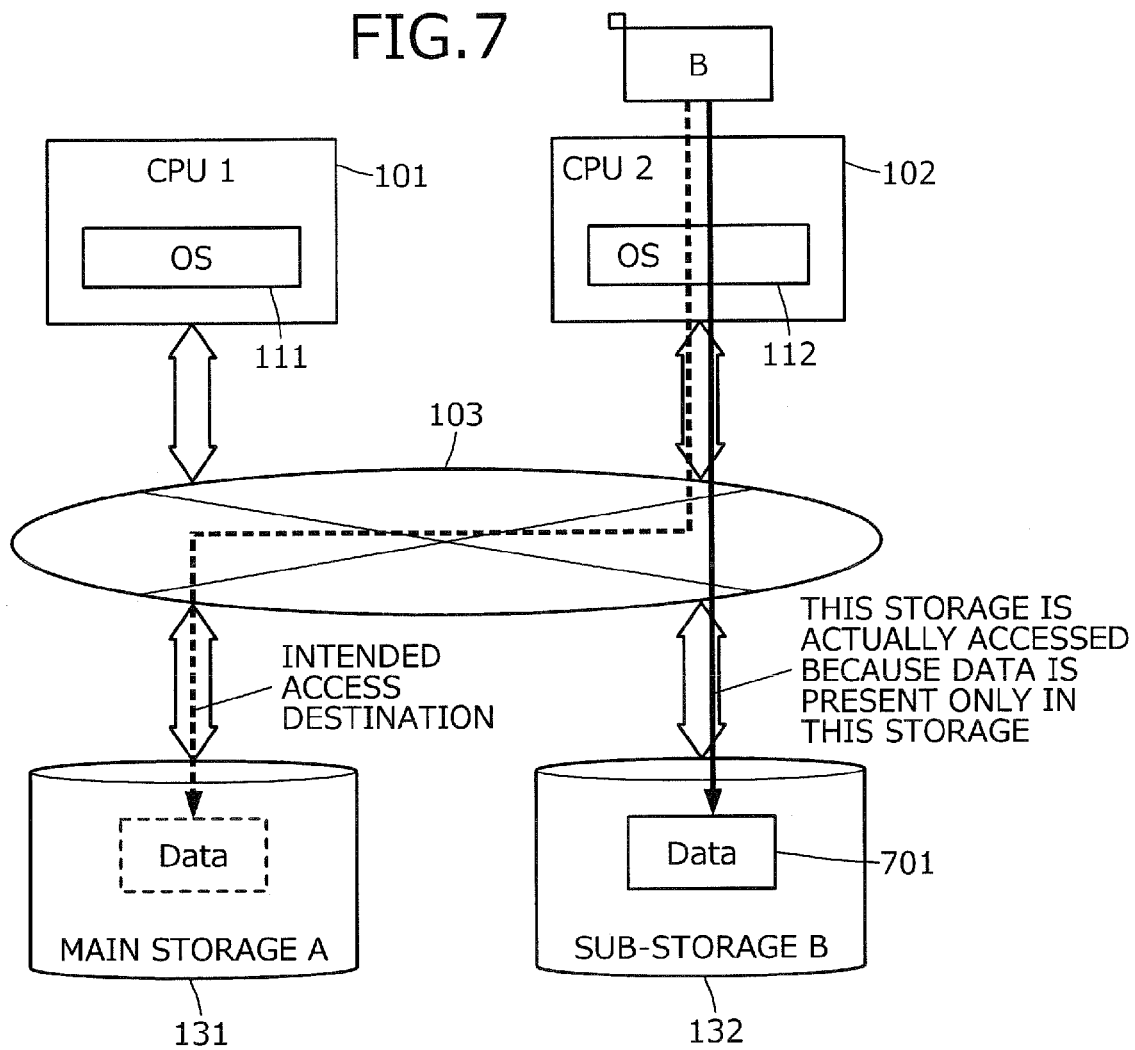

SCHEDULING METHOD AND SYSTEM

CROSS REFERENCE TO RELATED APPLICATIONS

This application is a continuation application of International Application PCT/JP2011/064841, filed on Jun. 28, 2011 and designating the U.S., the entire contents of which are incorporated herein by reference.

FIELD

The embodiments discussed herein are related to a scheduling method and system that prevent access contention for memory shared by multiple CPUs.

BACKGROUND

In a multicore system that includes storage units and CPUs in plural, multiple CPUs may attempt to access a single storage unit concurrently. As a countermeasure to prevent such a situation, it is conceivable that processing being performed while switching the storage units that are accessed.

For example, according to an existing technique, tasks that access a disk drive are grouped and the threads thereof are executed in series according to a task list to prevent contention at the disk (see, e.g., Japanese Laid-Open Patent Publication No. H7-104939). According to another technique, with respect to a storage access request having a time limit, if writing to an intended storage unit is not completed within the time limit, data is written into another storage unit and then transferred to the intended storage unit later (see, e.g., Japanese Laid-Open Patent Publication No. H10-91357).

According to another technique, in an image data search system, a multi-optical disk apparatus and a single-optical disk apparatus are connected and, image data is temporarily registered in the single-optical disk apparatus and then transferred to the multi-optical disk apparatus, thereby preventing access contention for the image data even if a registration request and a search request for the image data occur at the same time (see, e.g., Japanese Laid-Open Patent Publication No. H3-018976). According to yet another technique, in a multiprocessor, an arbitration logic unit is disposed that determines types of access requests to an HDD and that sets a different address space for each of the types to control the access requests such that any process may be executed first when access contention occurs (see, e.g., Japanese Laid-Open Patent Publication No. 2009-187327).

However, in the techniques described in Japanese Laid-Open Patent Publication Nos. H7-104939, H10-91357, H3-018976, and 2009-187327, access scheduling for storage and task scheduling of OSs are performed independently and therefore, access contention with respect to storage may be expected to occur among multiple CPUs when the CPUs attempt to access the storage. The occurrence of the access contention reduces access performance. With the technique described in Japanese Laid-Open Patent Publication No. 10-91357, since only access scheduling for the storage units is considered without coordination between the access scheduling of storage units and the task scheduling of OSs, access contention for one storage may occur when multiple CPUs execute respective tasks.

SUMMARY

According to an aspect of an embodiment, a scheduling method that is executed by a first CPU includes determining whether a task belongs to a first task category; determining whether a first access area accessed by the task is located in a first memory or a second memory, when the task belongs to the first task category; and setting a memory accessed by the task to the first memory or the second memory, based on a result at the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram of an internal configuration of the system;

FIGS. 3A, 3B, and 3C are tables depicting information of a database;

FIG. 7 is a diagram of a state of access to data before write-back;

DESCRIPTION OF EMBODIMENTS

Embodiments of a scheduling method and system will be described in detail with reference to the accompanying drawings. The scheduling method and system are applicable to a system, etc., that includes CPUs and memory storage devices in plural for processing tasks in parallel. By coordinating memory access scheduling and task scheduling, access contention with respect to one shared memory storage device among the multiple memory storage devices arising consequent to task execution is prevented, achieving higher efficiency of access processing with respect to the memory.

Figure 1:
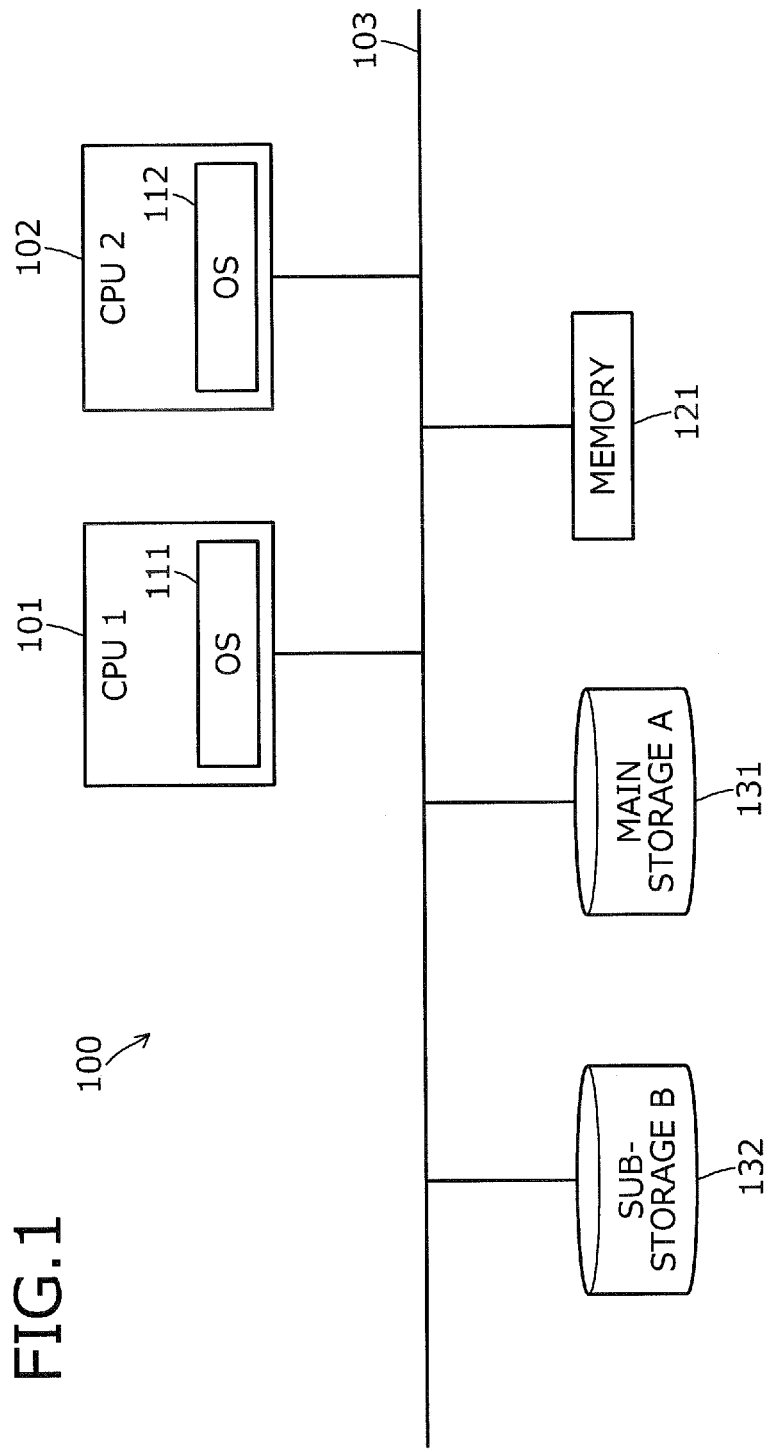
FIG. 1 is a diagram of a configuration example of a system that performs a scheduling method of an embodiment.

FIG. 1 is a diagram of a configuration example of a system that performs a scheduling method of an embodiment. A system 100 includes multiple CPUs (a first CPU 101, a second CPU 102) and the CPUs 101 and 102 include OSs 111 and 112, respectively. The CPUs 101 and 102 access memory 121 via a bus 103 and memory shared by multiple CPUs. The following description will be made using, as an example, a multicore configuration in which one computer is equipped with the CPUs 101 and 102 depicted in FIG. 1.

In the example depicted in FIG. 1, multiple memory storage devices shared by multiple CPUs are included. The memory storage devices include main storage (A) 131 as first memory and sub-storage (B) 132 as second memory. For example, hard disk apparatuses may be used for the main storage (A) 131 and the sub-storage (B) 132. In the following embodiment, both of the CPUs 101 and 102 primarily access the main storage 131, and share use of the storage 131. It is assumed that the sub-storage 132 is used temporarily to prevent access contention at the main storage 131 in this description.

FIG. 2 is a block diagram of an internal configuration of the system. The OS 111 on a master side includes a master scheduler 201, an access monitoring unit 202, a wait queue 203, and a task queue 204. The master scheduler 201 includes a storage scheduler 205, a task scheduler 206, and a task dispatch unit 207.

The OS 112 on a slave side includes a slave scheduler 211, an access monitoring unit 212, and a task queue 214. The slave scheduler 211 includes a task dispatch unit 217. The memory 121 includes a database (DB) 221.

The storage scheduler 205 of the master OS 111 takes a task from the wait queue 203 and determines an access destination (the main storage 131 or the sub-storage 132) for the task. During this process, the storage scheduler 205 determines the access destination according to characteristics (such as Read or Write, bandwidth utilization, and a processing time) of the task and notifies the task scheduler 206.

The task scheduler 206 of the master OS 111 determines an allocation destination of a task based on storage access scheduling information from the storage scheduler 205 and task scheduling information, and inserts the task into the task queue 204. The task scheduler 206 allocates tasks having the same storage access destination to the same CPU 101, 102. The task dispatch unit 207 controls based on the dispatch status of the CPU 101, task dispatch and task switching of tasks inserted in the task queue 204.

When storage is read from or written to, the access monitoring unit 202 of the master OS 111 specifies the storage (the main storage 131 or the sub-storage 132) that is to be accessed by a task, based on information concerning a task under execution.

The slave OS 112 controls the CPU 102 under the general control of the master OS 111. The slave scheduler 211 of the slave OS 112 includes the task dispatch unit 217 and the task dispatch unit 217 controls task dispatch and task switching of tasks inserted in the task queue 214, based on the dispatch status of the CPU 101. When storage is read from or written to, the access monitoring unit 212 of the slave OS 112 specifies the storage (the main storage 131 or the sub-storage 132) that is to be accessed by a task, based on information concerning a task under execution.

The database 221 of the memory 121 retains a task table, storage access scheduling information, and scheduling information of tasks.

FIGS. 3A, 3B, and 3C are tables depicting information of the database. FIG. 3A is a diagram of a task table 301 stored in the database 221. The task table 301 includes a write task table 311, a read task table 312, and an F-task table 313. Information of the F-task table 313 is referenced when a write task is written into different storage to prevent access contention. The F-task (corresponding to a write-back task) is a task of writing data to the storage actually intended to be accessed, from the storage into which the data is temporarily written. The F-task is dispatched at a timing that does not affect another task accessing the storage.

The write task table 311 includes information of (1) write task ID, (2) specified write area, (3) write specified area, (4) write-back determination flag, (5) temporary storage destination access read task, and (6) data size.

The (1) write task ID is an identifier (ID) of a write task of writing into storage. The (2) specified write area is an address of storage specified for writing. The (3) write specified area is an address of storage that is a destination of temporary writing. The (4) write-back determination flag is a flag value that indicates whether the writing of the data of the address of the specified write area has been completely written into the write specified area. The (5) temporary storage destination access read task is an ID of a task that accesses the address of the specified write area. The (6) data size is the size of data to be written.

The read task table 312 includes information of (1) read task ID, (2) specified access area, (3) read specified area, and (4) data size. The (1) read task ID is an identifier (ID) of a read task of reading from storage. The (2) specified access area is an address of storage specified for reading. The (3) read specified area is an address of storage from which reading is actually performed. The (4) data size is the size of data to be read out.

The F-task table 313 includes information of (1) F-task ID and (2) write-back write task ID. The (1) F-task ID is an ID of an F-task. The (2) write-back write task ID is a given write task ID for writing back the temporarily written data to storage that is the actually specified destination.

FIG. 3B is a diagram of a storage access scheduling table 321 and a task scheduling table 322 stored in the database 221. The storage access scheduling table 321 includes storage IDs, as well as allocated task IDs and an estimated end time, for each of the storage IDs. The storage IDs are IDs for identifying the main storage 131 and the sub-storage 132. The allocated task ID is the ID of the task accessing the storage. The estimated end time is the time in which the task is estimated to be completed and is obtained from an access end time estimation equation described later.

The task scheduling table 322 includes CPU IDs and an allocated task ID for each CPU ID. The CPU IDs are identifiers (IDs) of the CPUs 101, 102. An allocated task ID is the identifier (ID) of a task allocated to the CPUs 101, 102.

FIG. 3C is a chart that is stored in the database 221 and depicts classification of tasks that access the storage. As described in a depicted classification table 331, the tasks are classified into multiple categories (A to F in the depicted example) depending on the type of access to storage, how the bandwidth is utilized, the processing time, etc.

A task of category A corresponds to the access type: read, the bandwidth utilization: constant bandwidth, and data, etc. at the time of application processing such as a video. A task of category B corresponds to the access type: read, the bandwidth utilization: entire bandwidth, and uploaded data, etc. A task of category C corresponds to the access type: write, the bandwidth utilization: entire bandwidth, and downloaded data, etc. A task of category D corresponds to the access type: write, the bandwidth utilization: top priority, a momentary processing time, and swapped-out data, etc. A task of category E corresponds to the access type: read, the bandwidth utilization: top priority, a momentary processing time, and swapped-in data, etc. A task of category F (F-task) is a task related to a process of writing back from the sub-storage 132 to the main storage 131 and corresponds to the access type: read and write, and the bandwidth utilization: entire bandwidth.

Figure 4A:
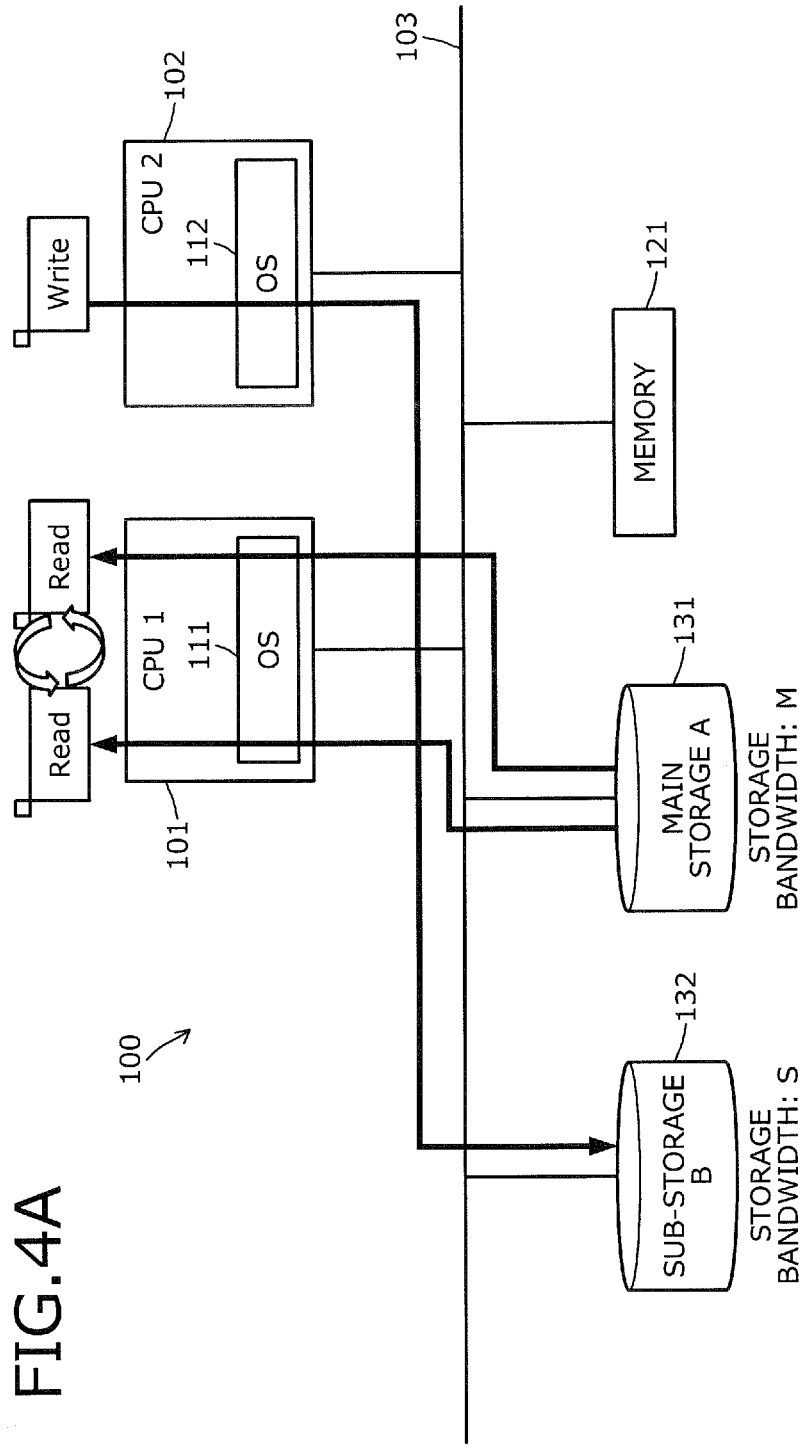
FIGS. 4A and 4B are diagrams of an overview of an access contention prevention process.
Figure 4B:
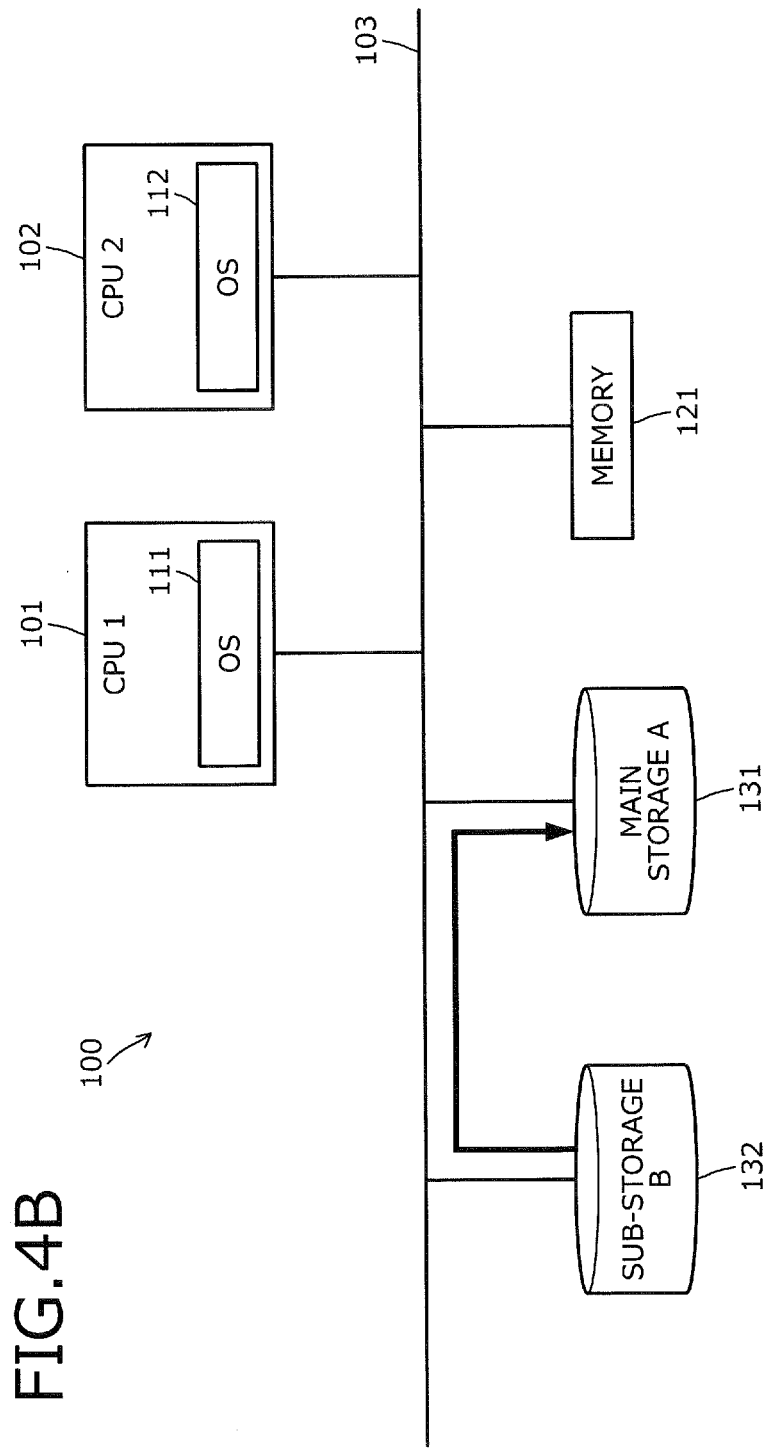

An overview of a process of preventing access contention among multiple CPUs with respect to one storage will be described. FIGS. 4A and 4B are diagrams of an overview of an access contention prevention process. First, as depicted in FIG. 4A, it is assumed that the CPU 101 is executing a read task of reading from storage. The read task has predetermined storage that is a read destination of data (the main storage 131 in the depicted example).

In this state, it is assumed that a write task newly occurs in the CPU 102. The data of the write access is assumed to be stored by accessing the main storage 131. However, since the CPU 101 is executing a read task with respect to the main storage 131, a storage destination of the write task is determined. In this determination, the access end times of the tasks accessing the main storage 131 are estimated and calculated based on information of storage bandwidths M and S of the storages, whereby among the storage 131 and 132, a write destination for the write task is determined. In the state of the depicted example, to prevent access contention consequent to the write task and the read task accessing the same main storage 131, the CPU 102 writes the write task into the sub-storage 132.

After the state depicted in FIG. 4A, as depicted in FIG. 4B, the data written into the sub-storage 132 is written into the main storage 131 (the process of the F-task) during a period when the main storage 131 is not being accessed. As a result, access contention among the multiple CPUs with respect to the same storage can be prevented. In this case, the OSs 111 and 112 of the CPUs 101 and 102 refer to the database 221 stored in the memory 121 to allocate to the same CPU, tasks that access the same storage, to thereby prevent access contention for the same storage.

A specific example of an estimation of an access end time of a task will be described. This estimation process is executed by the storage scheduler 205. The storage scheduler 205 performs an estimation calculation for determining into which storage, the tasks C and D, i.e., write tasks, are to be written.

Conditions at the time of the calculation are as follows.

1. A read task of the category A utilizes a constant bandwidth to access the storage. A task of the category A can perform parallel access with a task of another category B, C, D, E, or F.

2. A task of the category B, C, D, E, or F utilizes the entire available bandwidth to access the storage. In other words, the task utilizes the entire bandwidth not used by the category A.

3. Tasks of the categories B, C, D, E, and F are sequentially processed. Parallel access is permitted only with a task of the category A.

It is assume that M is a storage bandwidth of the main storage 131; S is a storage bandwidth of the sub-storage 132; Bmx is a data amount of a task Bx of the category B allocated to the main storage 131; Cmx is a data amount of a task Cx of the category C allocated to the main storage 131; Amx is a usage bandwidth of a task Ax of the category A allocated to the main storage 131; Bsx is a data amount of the task Bx of the category B allocated to the sub-storage 132; Csx is a data amount of the task Cx of the category C allocated to the sub-storage 132; and Asx is a usage bandwidth of the task Ax of the category A allocated to the sub-storage 132. In this case, when Tm and Ts are access end times at the time of allocation to the respective storages, Tm and Ts can be obtained from the equations below.

$$Tm = \frac{\sum Bmx + \sum cmx}{M - \sum Amx} \quad (1)$$

$$Ts = \frac{\sum Bsx + \sum csx}{S - \sum Asx}$$

If Tm>Ts is satisfied, an instruction is given to write the write tasks C and D into the sub-storage 132 and if Tm<Ts is satisfied, an instruction is given to write the write tasks C and D into the main storage 131.

Storage access scheduling performed by the storage scheduler 205 will be described. FIGS. 5A, 5B, 5C, 5D, and 5E are diagrams of examples of access scheduling for storage. An example of scheduling in the order of the categories A, C (C1, C2), B, and D will be described. It is assumed that object data of the categories A and B are present in the main storage 131 and each has a utilized bandwidth of 10, and that data amounts of B, C1, and C2 are 30, 20, and 30, respectively. Both the main storage 131 and the sub-storage 132 have a storage bandwidth of 50.

Figure 5A:
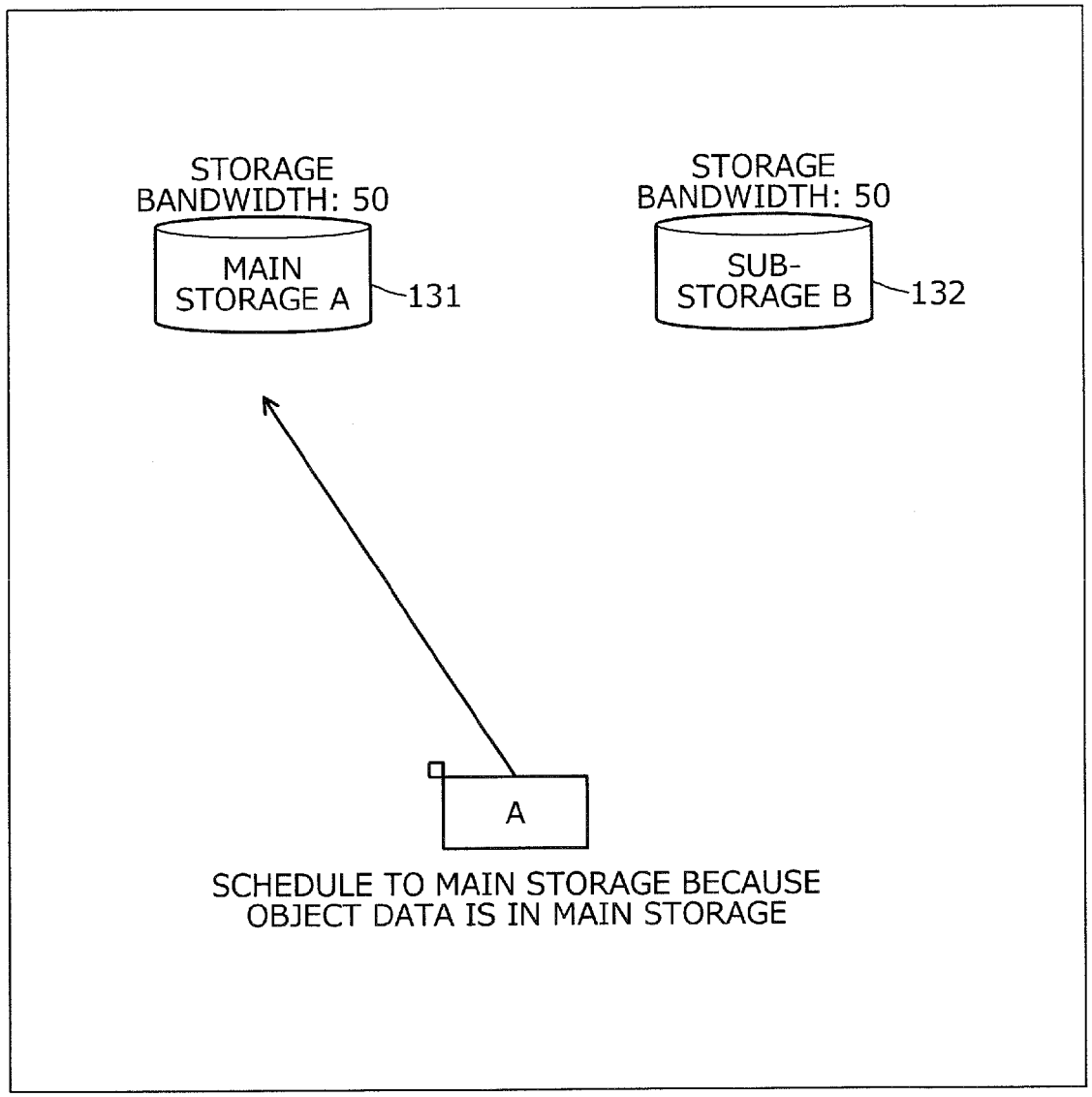
FIGS. 5A, 5B, 5C, 5D, and 5E are diagrams of examples of access scheduling for storage.
Figure 5B:
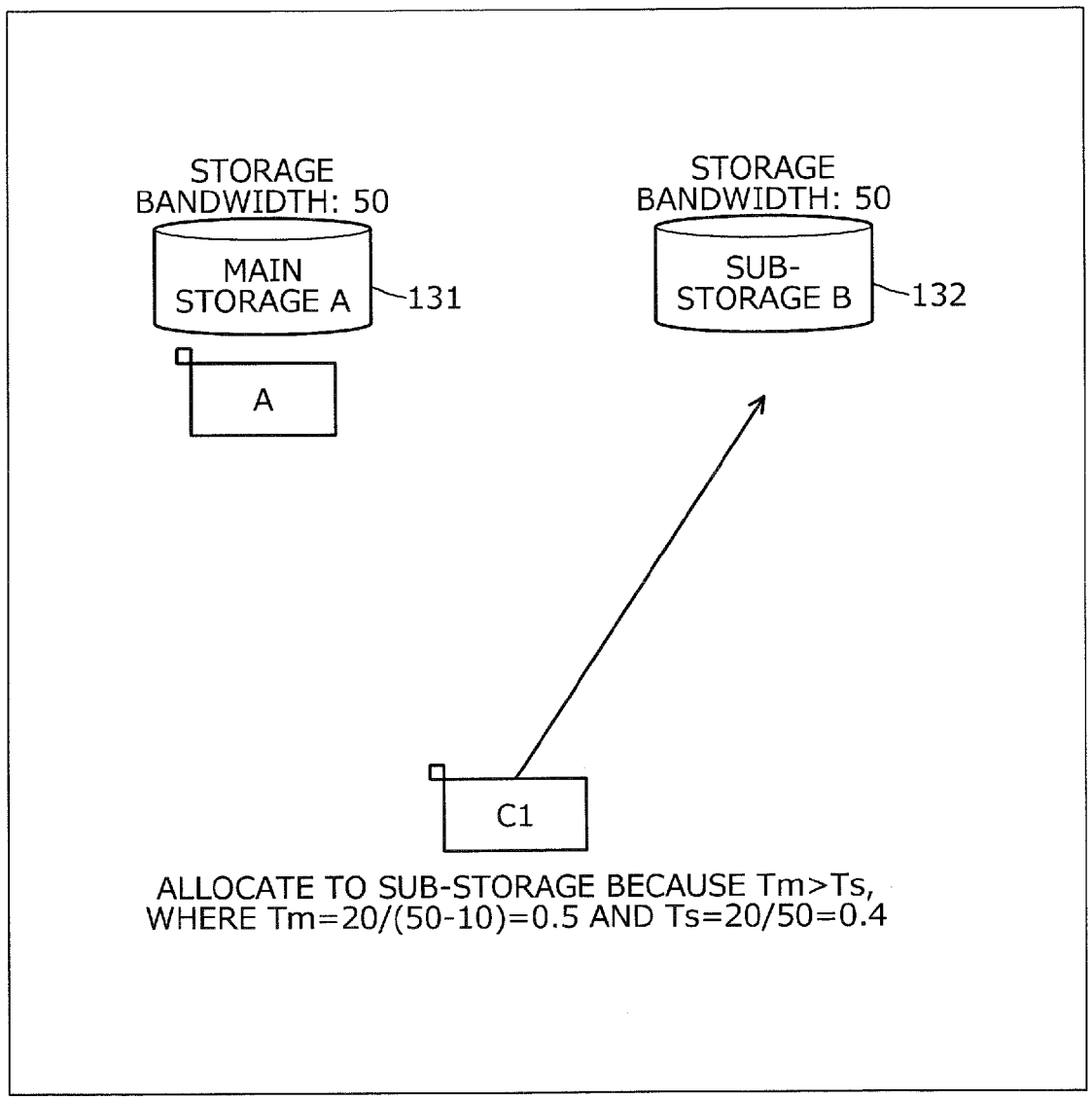

As depicted in FIG. 5A, first, the storage scheduler 205 takes a read task of the category A from the wait queue 203. Since the object data of the category A is present in the main storage 131, this task is allocated to the main storage 131. As depicted in FIG. 5B, for a write task of the category C (C1), Tm=20/(50−10)=0.5 and Ts=20/50=0.4 are calculated according to the estimation calculations of the access end time above and therefore, this task of the category C1 is allocated to the sub-storage.

Figure 5C:
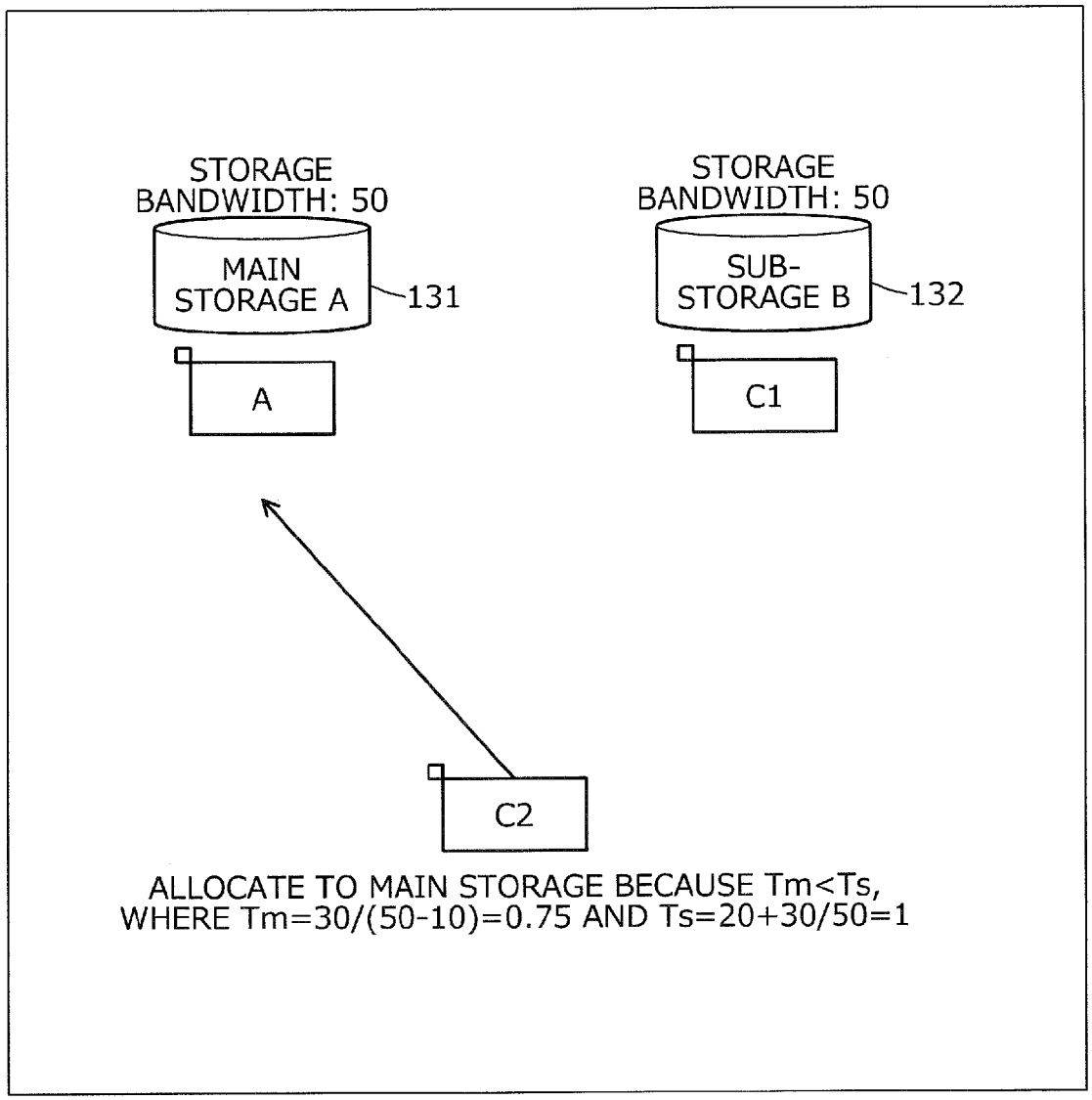
Figure 5D:
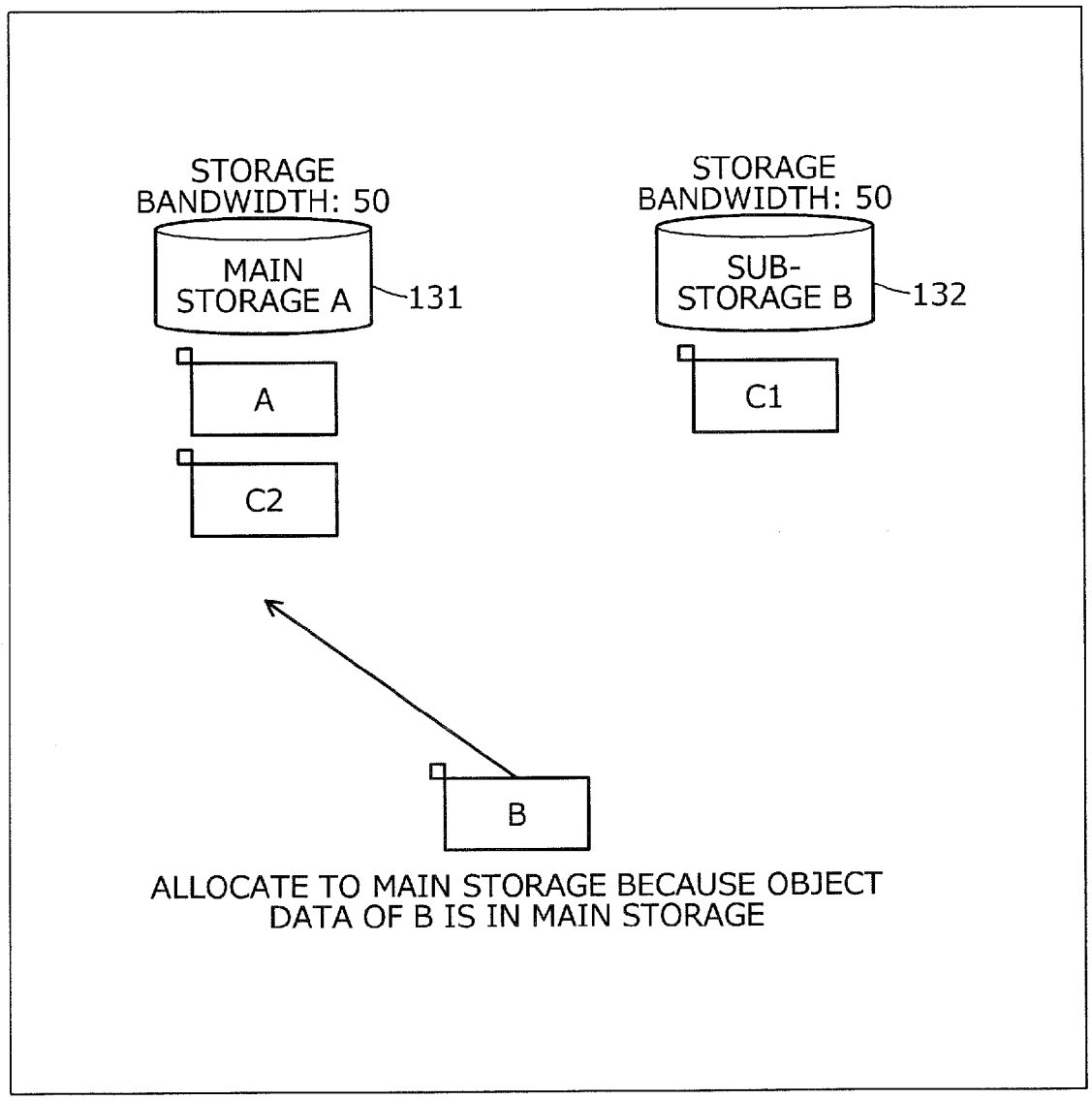
Figure 5E:
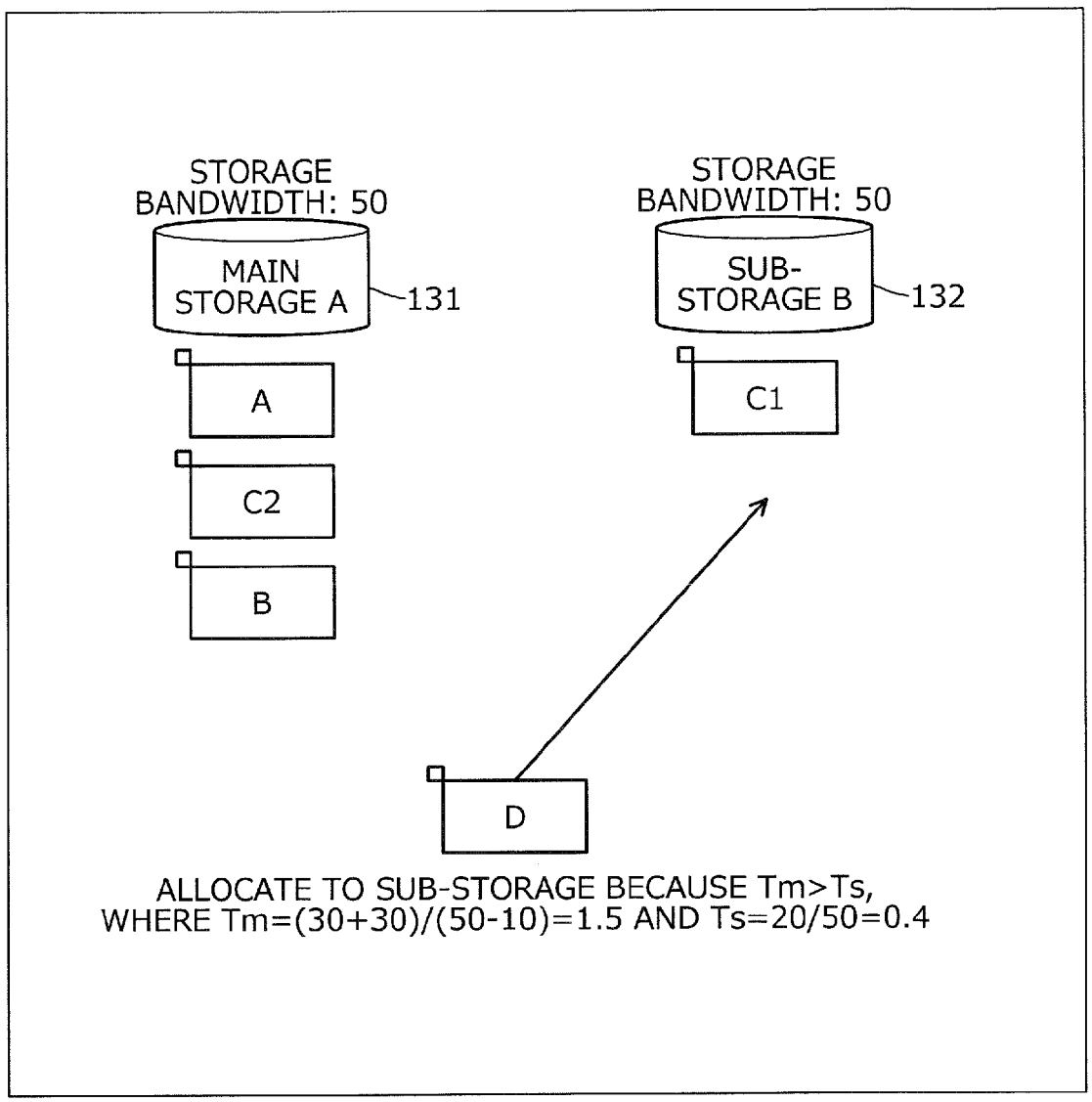

As depicted in FIG. 5C, for a write task of the category C (C2), Tm=30/(50−10)=0.75 and Ts=20+30/50=1 are obtained and therefore, this task of the category C2 is allocated to the main storage. As depicted in FIG. 5D, since a read task of the category B is present in the main storage 131, this task of the category B is allocated to the main storage 131. Lastly, as depicted in FIG. 5E, for a write task of the category D, Tm=(30+30)/(50−10)=1.5 and Ts=20/50=0.4 are calculated and therefore, this task of the category D is allocated to the sub-storage.

The storage scheduler 205 stores the ID and the estimated end time of the allocated task into the storage access scheduling table 321, for each scheduling session.

Coordination between storage access and task access will be described. The task scheduler 206 reads the scheduling information of the storage scheduler 205 from the storage access scheduling table 321 and queues tasks into task queues of the CPUs. The task dispatch units 207 and 217 perform task dispatch of the tasks in the task queues 204 and 214, based on the dispatch statuses of the CPUs 101 and 102. The access monitoring units 202 and 212 specify the main storage 131 or the sub-storage 132 as the storage to be accessed by a task, based on information of a task under execution at the time of occurrence of reading from or writing to the storage.

The task scheduler 206 queues tasks into the task queues 204 and 214 of the respective CPUs 101 and 102 such that the storage access destinations are set to the same storage. As a result, access contention for the same storage is prevented. The task dispatch units 207 and 217 dispatch only one of the tasks of the categories B and C for each of the CPUs 101 and 102. Tasks of the categories B and C are kept in the task queues 204 and 214 if another task of the categories B and C is already dispatched.

If a task of the category A, D, or E is queued, the task dispatch units 207 and 217 immediately dispatch the task. This is because a task of the category A, D, or E has a smaller effect on access contention. In particular, a task of the category A does not entirely use the band width and a task of the categories D and E has a very short processing time.

When a task of the category F is scheduled for storage access, if no tasks of the categories B and C are present in the task queues 204 and 214 of the CPUs 101 and 102 and no tasks of the categories B and C have been dispatched by the CPUs 101 and 102, the task dispatch units 207 and 217 dispatch the task of the category F.

If a task of the category B or C is queued while a task of the category F is dispatched, the task dispatch units 207 and 217 immediately return the task of the category F to the task queues 204 and 214. This is performed to prevent performance deterioration due to write-back.

FIGS. 6A, 6B, 6C, 6D, and 6E are diagrams of an example of scheduling in which storage access and task access are coordinated. As is the case with FIGS. 5A to 5E, it is assumed that object data of the categories A and B are present in the main storage 131 and both have a utilized bandwidth of 10 and that data amounts of B, C1, and C2 are 30, 20, and 30, respectively. Both the main storage 131 and the sub-storage 132 have a storage bandwidth of 50. For an occurrence order of tasks of the categories A→C1→C2→B→D and the storage scheduling of the tasks, the result described with reference to FIGS. 5A to 5E will be utilized.

Figure 6A:
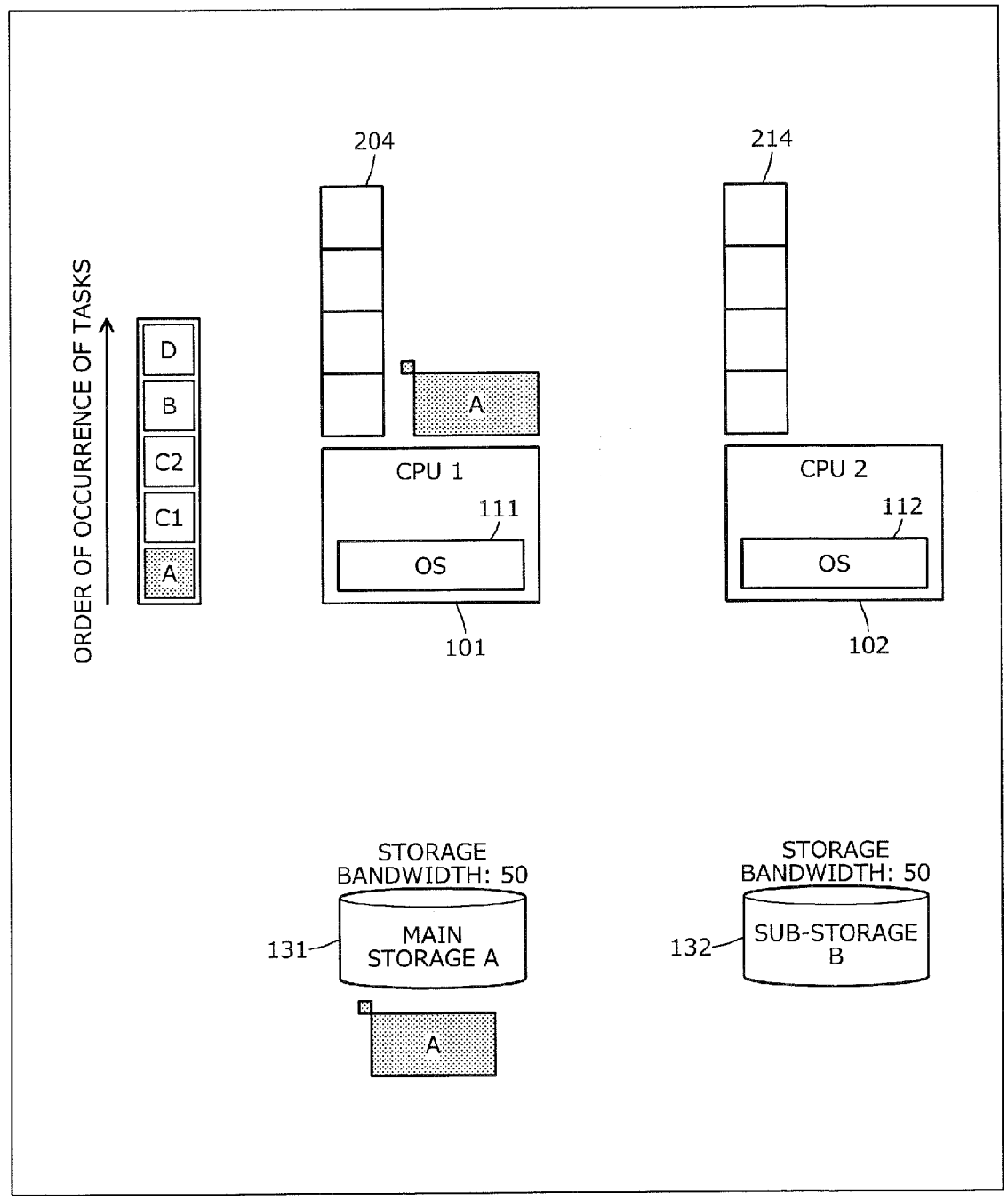
FIGS. 6A, 6B, 6C, 6D, and 6E are diagrams of an example of scheduling in which storage access and task access are coordinated.

First, as depicted in FIG. 6A, a task of the category A is scheduled to access the main storage 131 by the storage scheduler 205 (see FIG. 5A). The task of the category A can be allocated to either of the CPUs 101 and 102. In the depicted example, it is assumed that the task scheduler 206 allocates the task of the category A to the CPU 101.

Figure 6B:
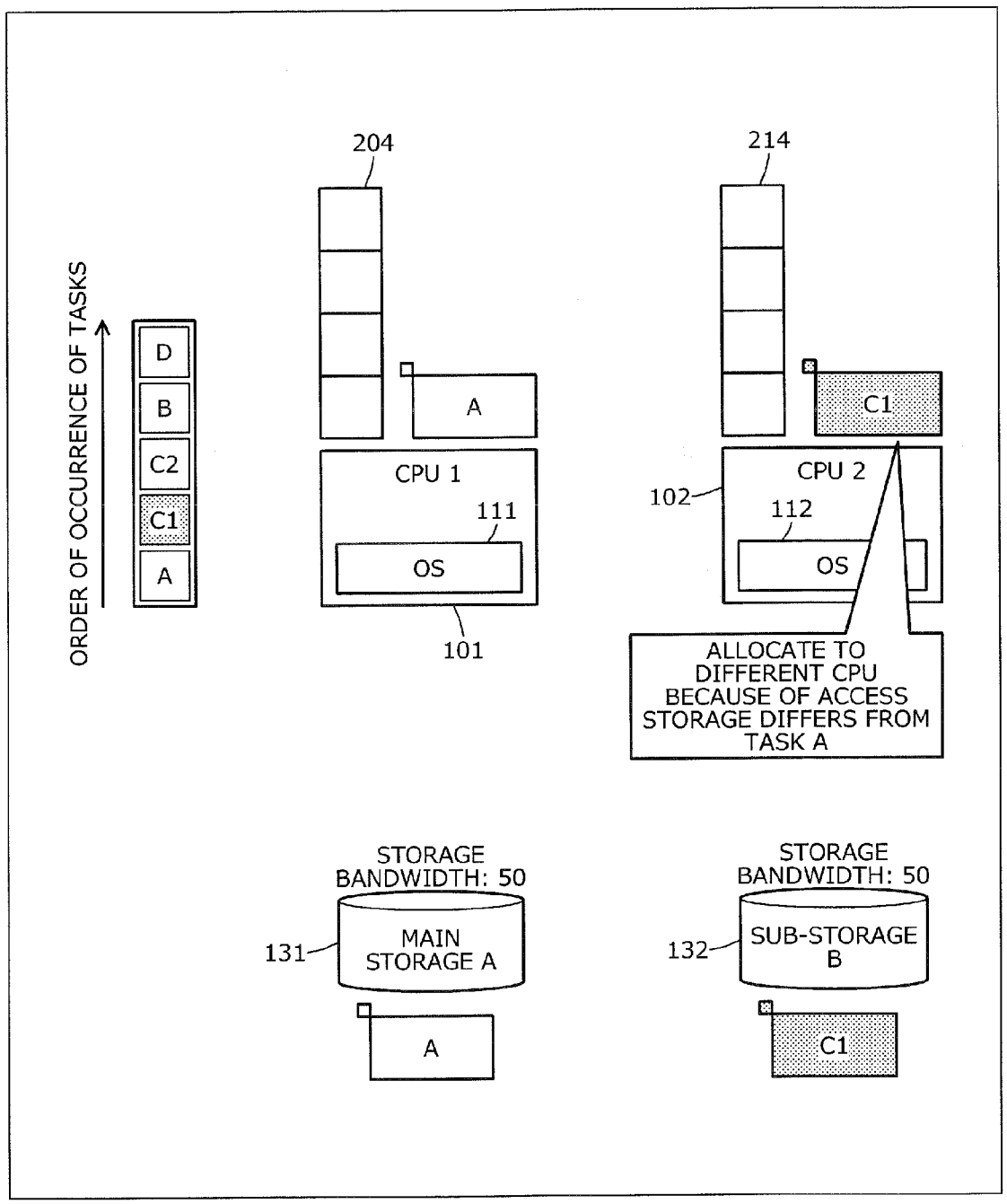

As depicted in FIG. 6B, the storage scheduler 205 schedules the next task, which is of the category C1, to access the sub-storage 132 (see FIG. 5B). Because the storage to be accessed is different from that of the task of the category A, the task scheduler 206 allocates the task of the category C1 to a different CPU (CPU 102).

Figure 6C:
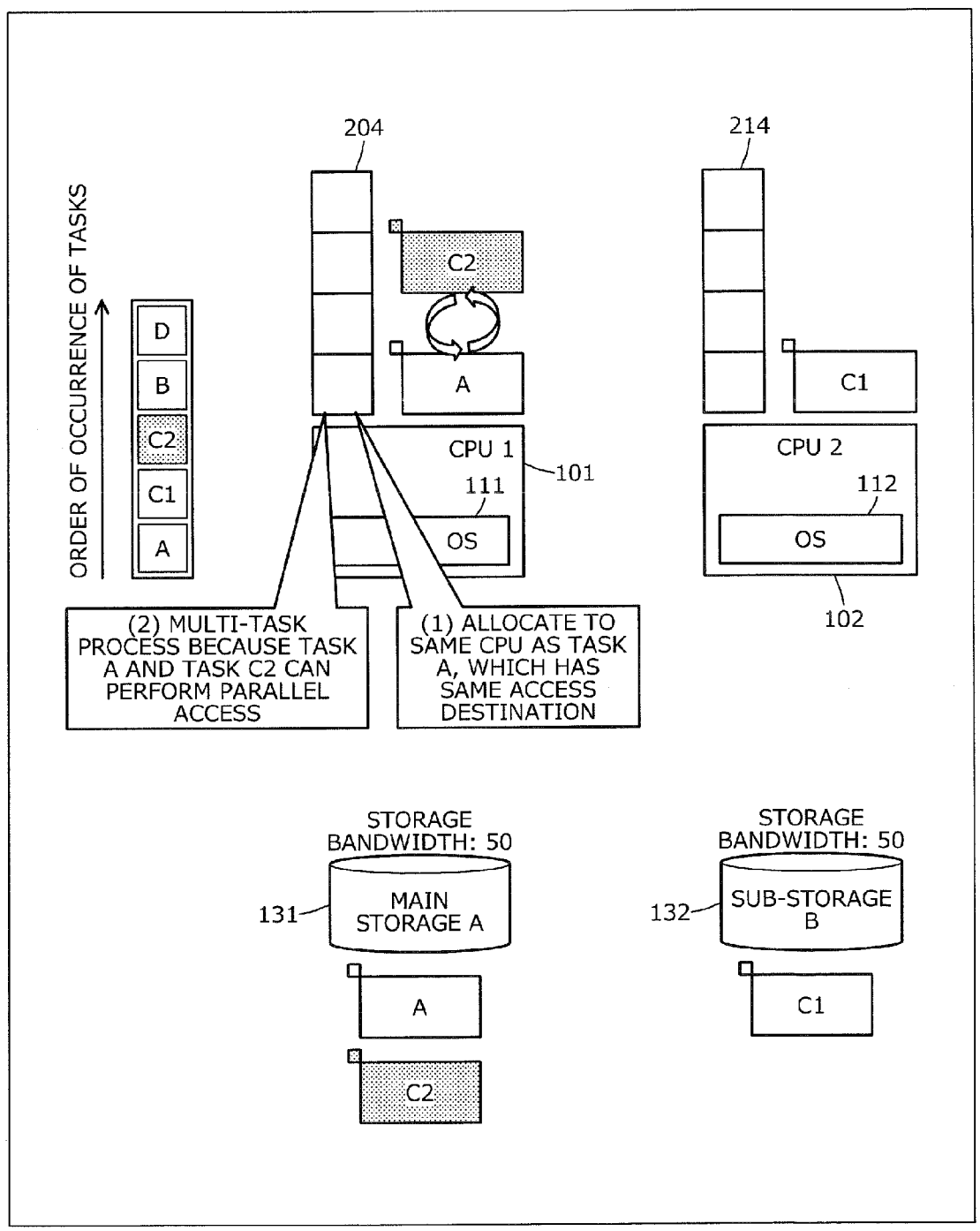

As depicted in FIG. 6C, the storage scheduler 205 schedules the next task, which is of the category C2, to access the main storage 131 (see FIG. 5C). The task scheduler 206 allocates the task of the category C2 to the CPU 101, the same as the task A, which has the same access destination. As described above, since the task of the category A and the task of the category C (C2) can perform access in parallel, the CPU 101 executes a multi-task process for the tasks of the categories A and C2.

Figure 6D:
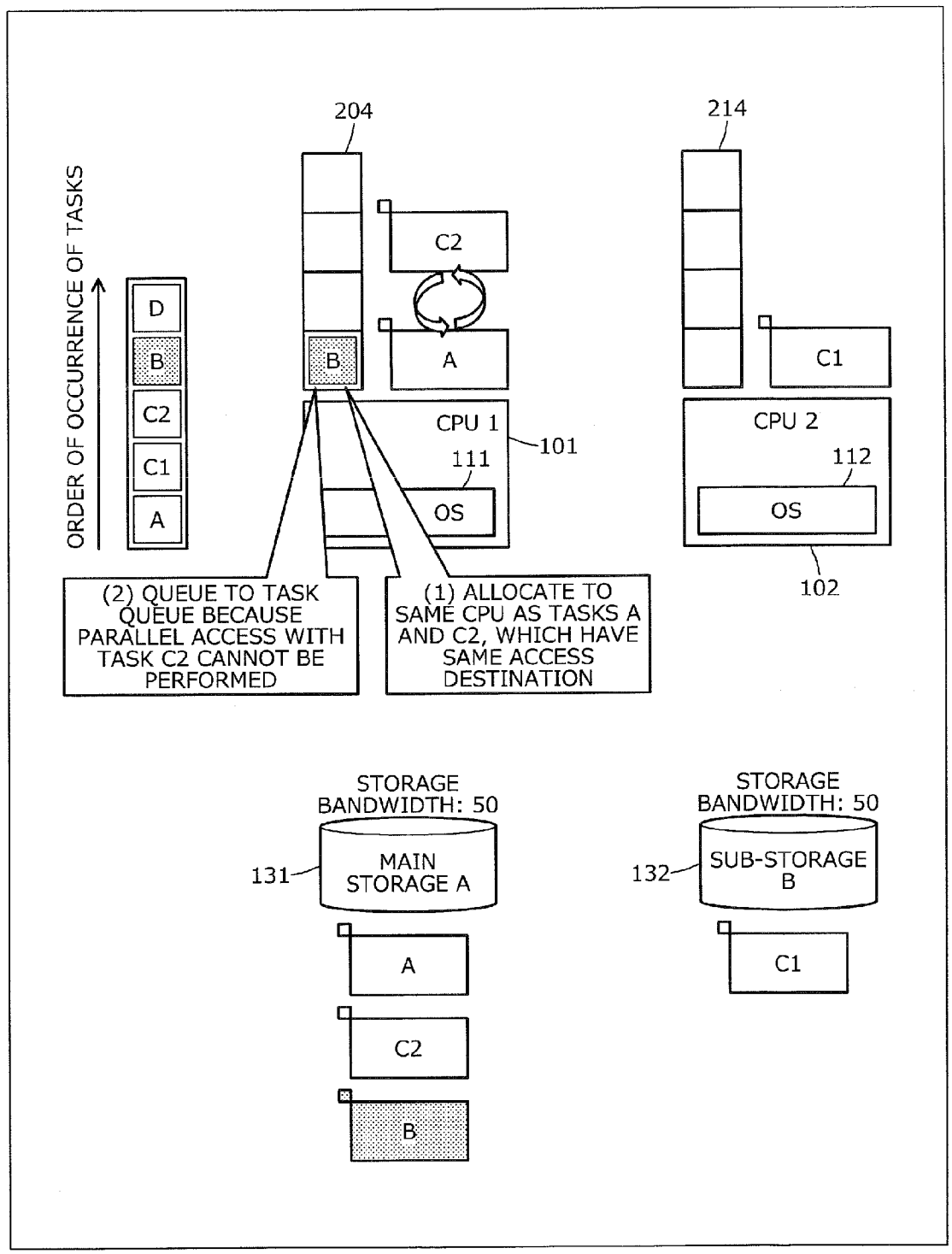

As depicted in FIG. 6D, the storage scheduler 205 schedules the next task, which is of the category B, to access the main storage 131 (see FIG. 5D). The task scheduler 206 allocates the task of the category B to the CPU 101, the same as the tasks A and C2, which have the same access destination. However, as described above, since the task of the category B cannot perform access in parallel with a task of the category C (C2), the CPU 101 queues the task of the category B into the task queue 204.

Figure 6E:
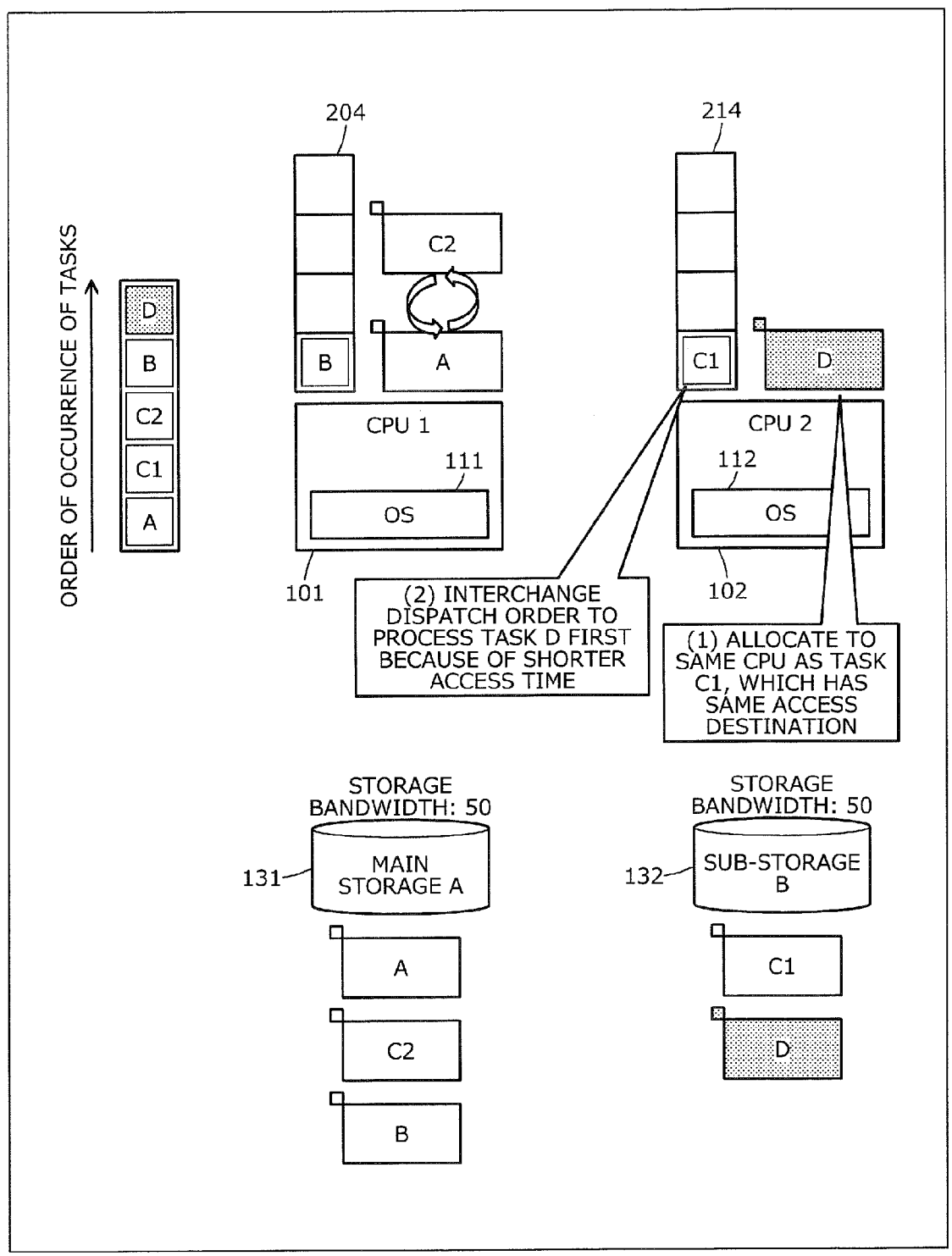

As depicted in FIG. 6E, the storage scheduler 205 schedules the next task, which is of the category D, to access the sub-storage 132 (see FIG. 5E). The task scheduler 206 allocates the task of the category D to the CPU 102, the same as the task C1, which has the same access destination. However, since the task of the category D has a shorter access time, the task dispatch unit 217 interchanges the dispatch order of the task of the category C1 and the task of the category D to allow the task of the category D to be processed first.

If a task of write access is scheduled for storage other than the intended storage, an F-task is generated to perform write-back to the intended storage. Therefore, a temporary area is established until completion of the write-back.

FIG. 7 is a diagram of a state of access to data before write-back. For example, it is assumed that a state occurs in which a task of the category B is temporarily stored in the sub-storage 132 instead of the main storage 131, which is the intended storage. If access occurs for such data 701 before completion of the write-back, control of access has to be performed so that the sub-storage 132 in which the data 701 is temporarily stored is accessed instead of the main storage 131, which is the actual storage destination of the data 701.

To support the write-back of the data, unique task information is added in advance to each task to allow coordination between the task scheduler 206 and the storage scheduler 205. The information used for this coordination is the task table 301 depicted in FIG. 3A and described above. The storage scheduler 205 refers to the task table 301 to identify an access destination. If a read task exists that is accessing the temporary storage destination (the sub-storage 132 in the example) indicated in the write task table 311, the temporarily stored data 701 is protected. The storage scheduler 205 refers to the task table 301 during scheduling and determines the scheduling of the F-task.

Figure 8A:
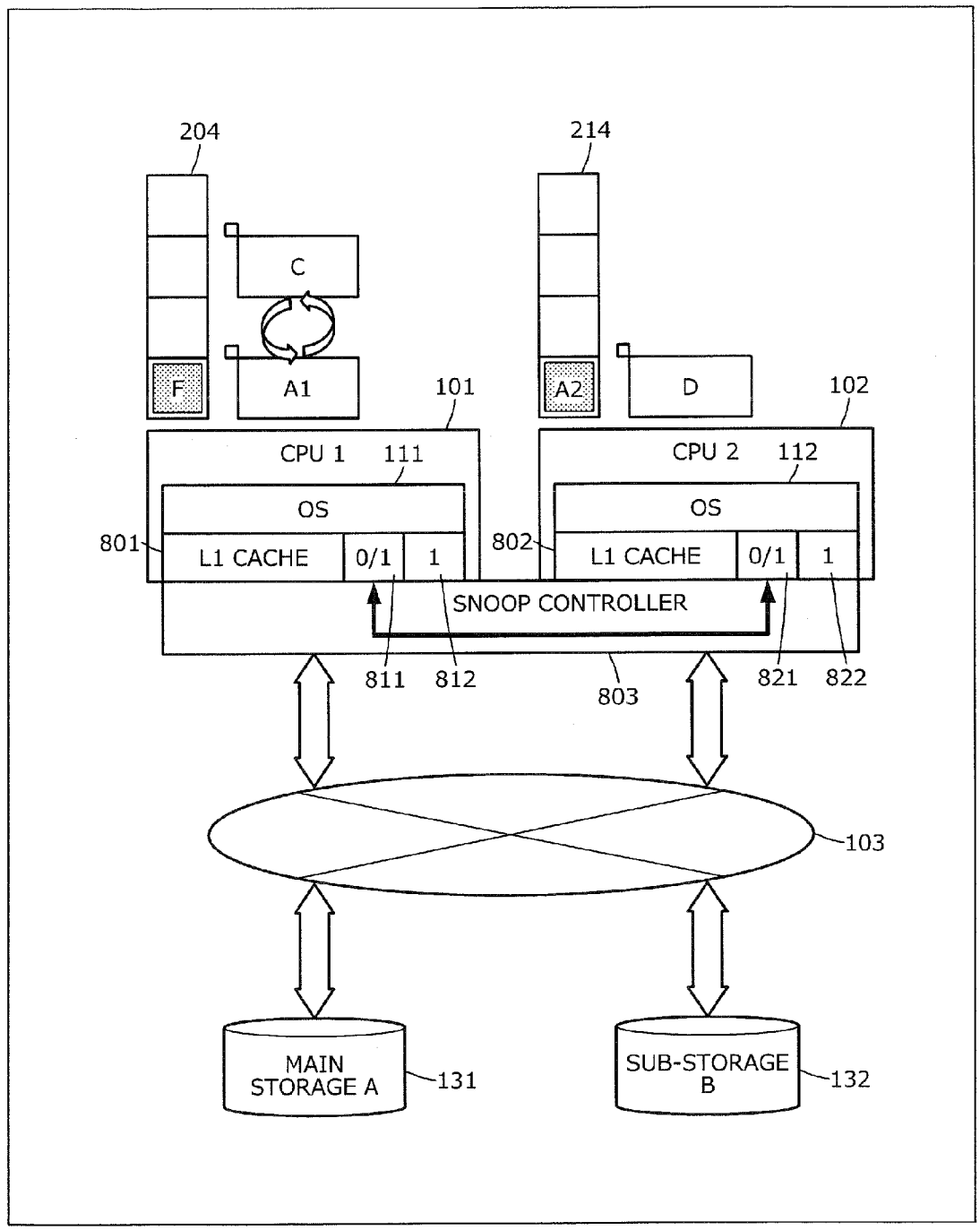
FIGS. 8A, 8B, and 8C are diagrams of a process related to the write-back of data.
Figure 8B:
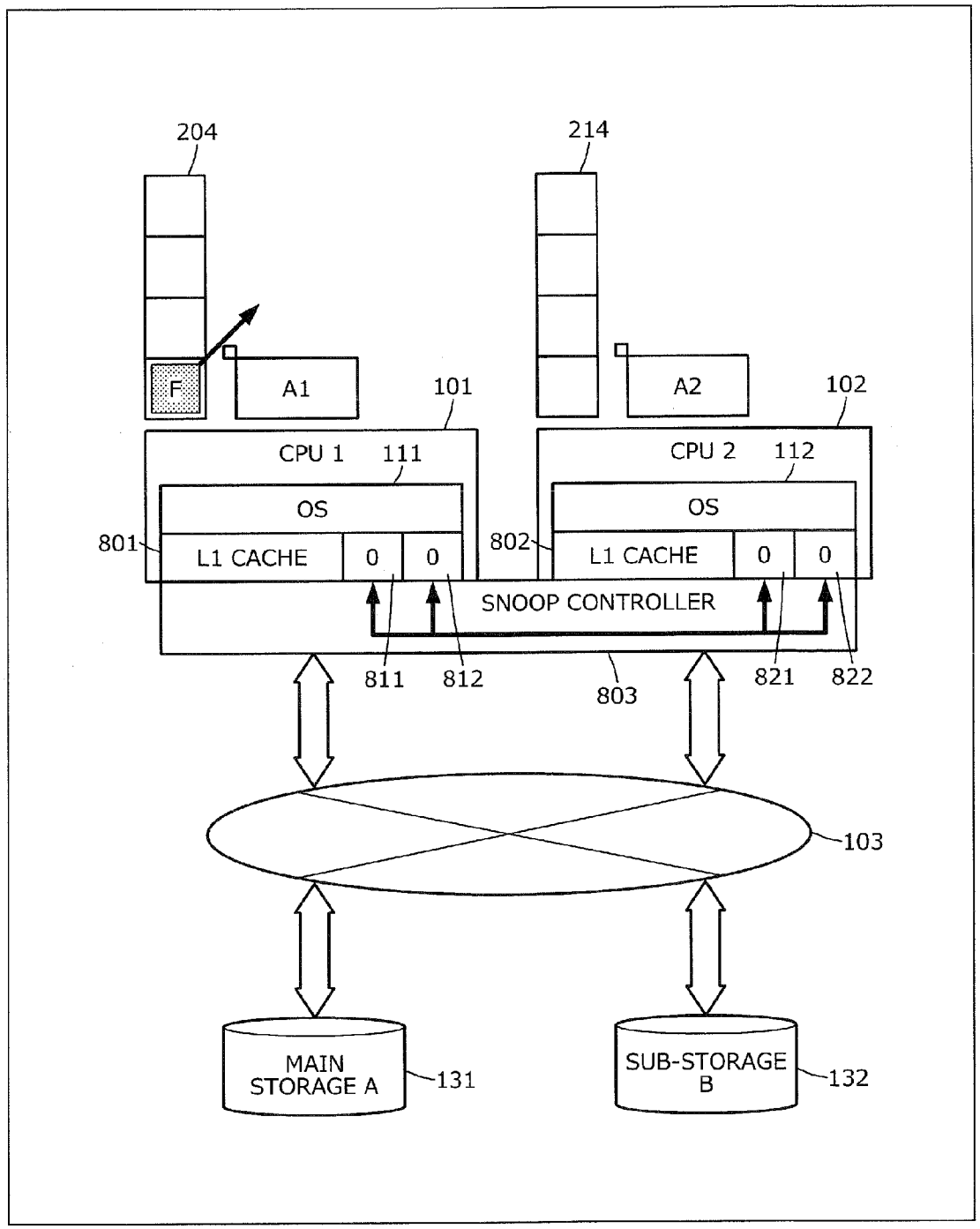
Figure 8C:
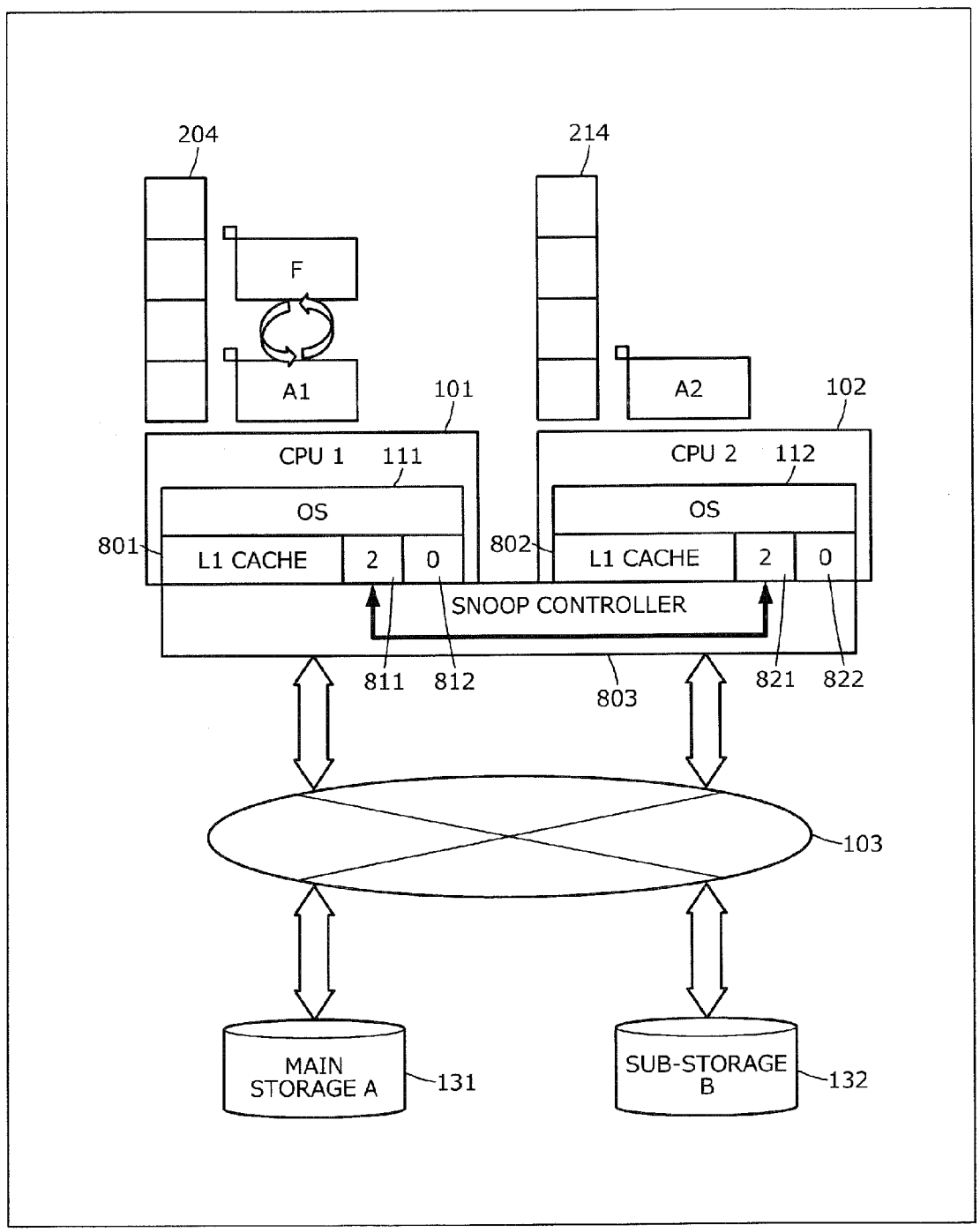

A dispatch example of an F-task will be described. FIGS. 8A, 8B, and 8C are diagrams of a process related to the write-back of data. As depicted in FIG. 8A, a snoop controller 803 is disposed between the caches (L1 caches) 801 and 802 of the CPUs 101 and 102. Update data of the caches 801 and 802 is exchanged between the CPUs 101 and 102, via the snoop controller 803, to maintain the coherency of the caches 801 and 802.

The cache 801 has operation flags (referred to as C-flags) 811 and 812 of the CPUs 101 and 102, and the cache 801 has C-flags 821 and 822 of the CPUs 101 and 102.

The C-flags 811 and 821 for the CPU 101 take a value of "1" when the CPU 101 is executing a task of the category B, C, D, or E, and takes a value of "2" when the CPU 101 is executing an F-task. In the same way, the C-flags 812 and 822 for the CPU 102 take a value of "1" when the CPU 102 is executing a task of the category B, C, D, or E, and take a value of "2" when the CPU 102 is executing an F-task. In the other cases (including the case of execution of a task of the category A), the value is "0" (OFF).

As depicted in FIG. 8A, it is assumed that the CPU 101 executes a multi-task process for a task A1 of the category A and a task of the category C with a task of the category F queued in the task queue 204. It is also assumed that the CPU 102 executes a task of the category D with a task of the category A2 queued in the task queue 214. In this case, the C-flags 811 and 821 of the CPU 101 are set to "1" during execution of the task of the category C and "0" during execution of the task of the category A. The C-flags 812 and 822 of the CPU 102 are set to "1" consequent to the execution of the task of the category D.

As depicted in FIG. 8B, when the task of the category C is completed at the CPU 101 (the execution of the task (A1) of the category A continues), the values of the C-flags 811 and 821 of the CPU 101 become "0". When the task of the category D at the CPU 102 is completed, the task (A2) of the category A is then executed and the values of the C-flags 812 and 822 of the CPU 102 become "0", in this case. As a result, since the values of all the C-flags 811 and 812 become "0", the CPU 101 dispatches the F-task of the task queue 204.

Consequently, as depicted in FIG. 8C, the CPU 101 executes the F-task of the category F and the values of the C-flags 811 and 821 of the CPU 101 are set to "2" during the execution of the F-task. As described above, the F-task of the category F is executed by only one CPU among the CPUs 101 and 102.

As described above, in the embodiment, the storage scheduler 205 and the task scheduler 206 operate in a coordinated manner. Based on an access scheduling result of the storage scheduler 205, the task scheduler 206 distributes tasks to the CPUs 101 and 102.

Figure 9:
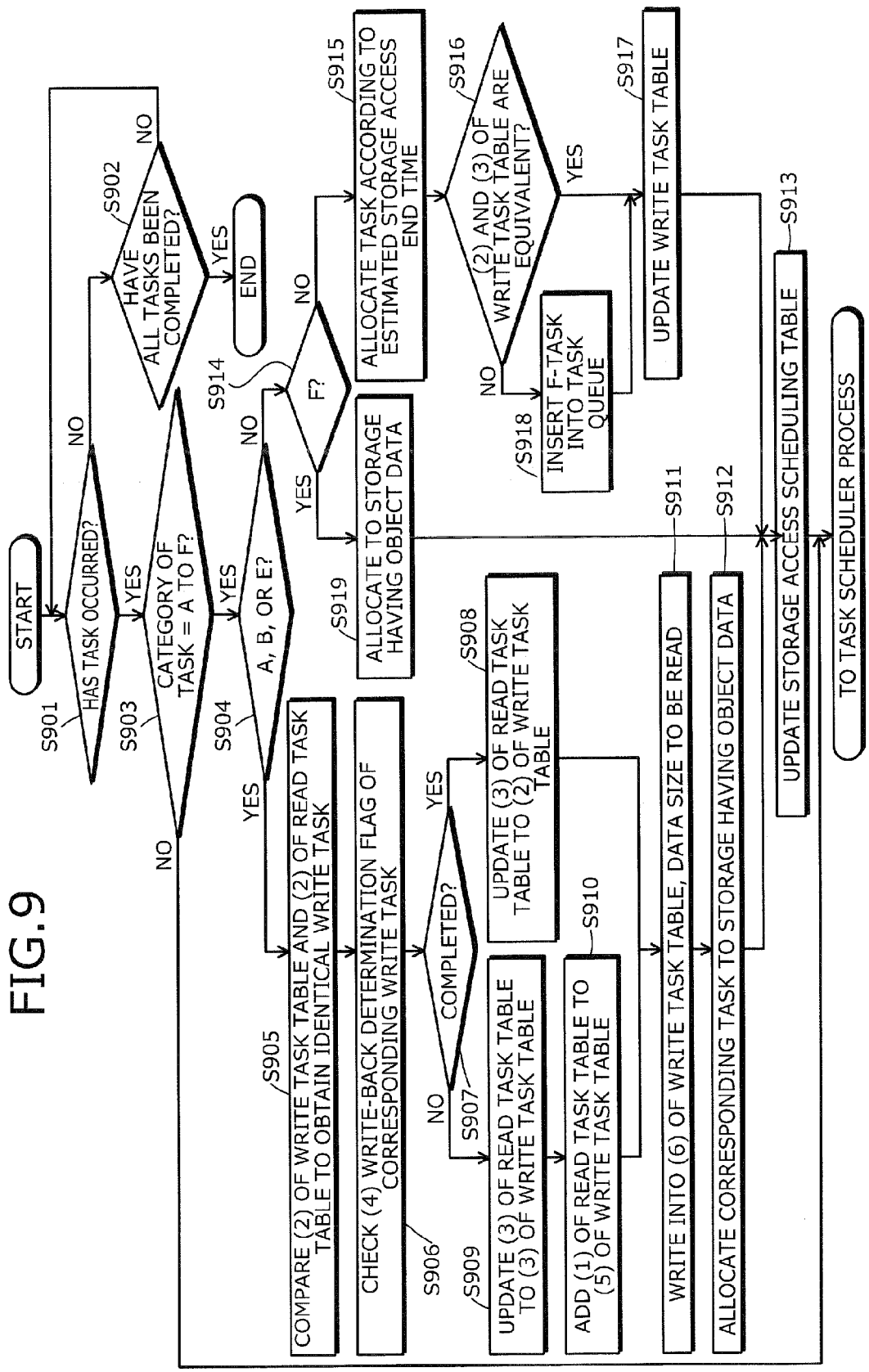
FIG. 9 is a flowchart of a process procedure executed by a storage scheduler.

FIG. 9 is a flowchart of a process procedure executed by the storage scheduler. The storage scheduler 205 disposed in the master scheduler 201 waits for the occurrence of a task (S901: NO and step S902: NO) and if a task occurs (step S901: YES), the storage scheduler 205 determines the type of the task (step S903). If no task occurs (step S901: NO) and all the tasks have been completed (step S902: YES), the process is terminated.

In the determination of the type of the task at step S903, if the task is of the predetermined categories A to F (step S903: YES), the storage scheduler 205 determines whether the task is a read task of the category A, B, or E (step S904). If the task is not of the categories A to F (step S903: NO), the process transitions to a process of the task scheduler 206 (FIG. 10 described later) without performing the storage scheduling.

If the task is a read task of the category A, B, or E at step S904 (step S904: YES), the storage scheduler 205 checks which storage the access data is present, and schedules the task for the storage in which the access data is present. First, the storage scheduler 205 refers to the task table 301 and compares the (2) specified write area of the write task table 311 and the (2) specified access area of the read task table 312 to obtain an identical write task (step S905).

The storage scheduler 205 checks the (4) write-back determination flag of the corresponding write task (step S906) to determine whether write-back has been completed (step S907). If the write-back has been completed (step S907: YES), the storage scheduler 205 updates the (3) read specified area of the read task table 312 to the (2) specified write area of the write task table 311 (step S908) and proceeds to step S911.

On the other hand, if the write-back has not been completed at step S907 (step S907: NO), the storage scheduler 205 updates the (3) read specified area of the read task table 312 to the (3) write specified area of the write task table 311 (step S909), adds the (1) read task ID of the read task table 312 to the (5) temporary storage destination access read task of the write task table 311 (step S910), and proceeds to step S911.

Figure 10:
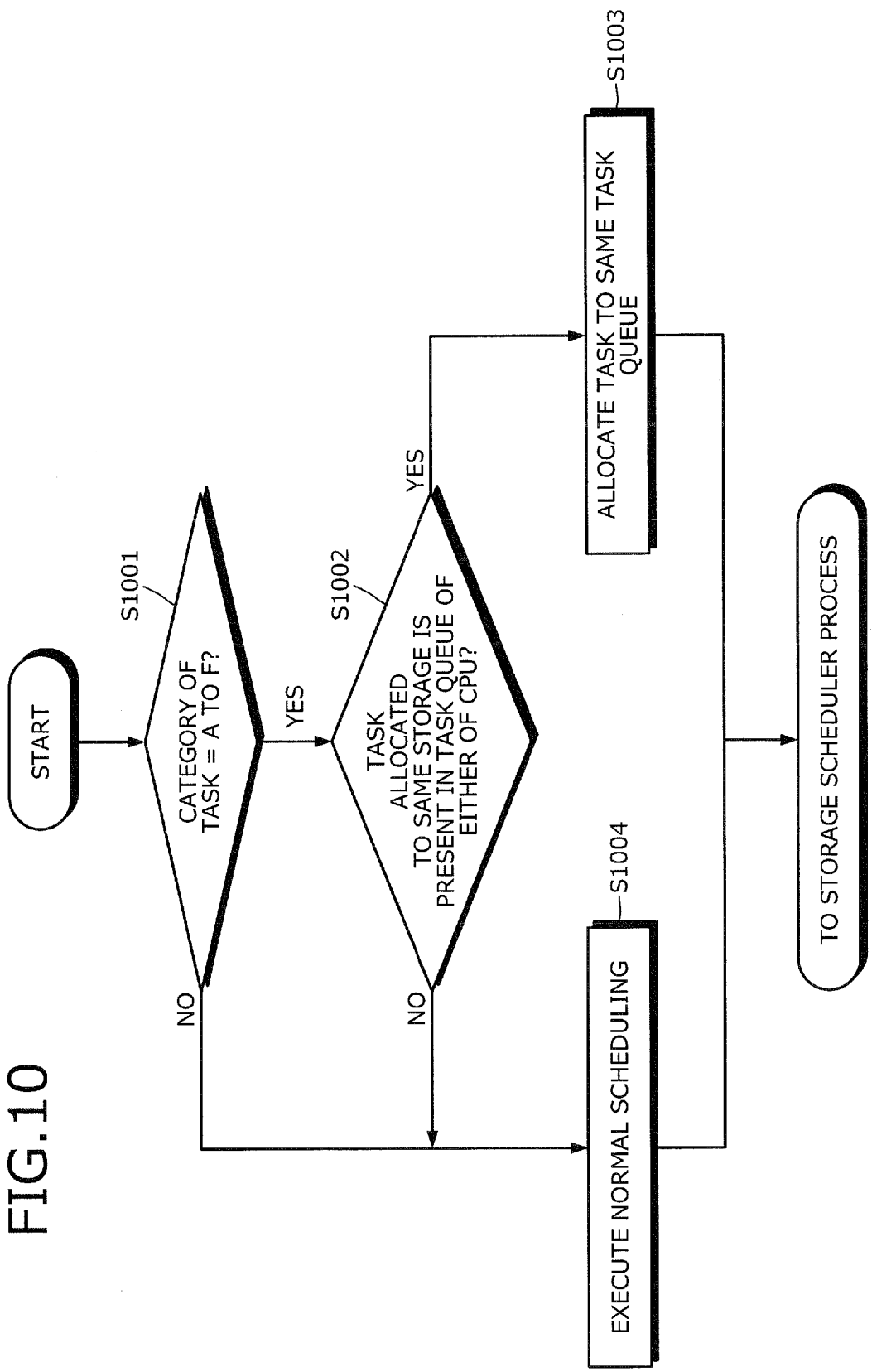
FIG. 10 is a flowchart of a process procedure executed by a task scheduler.

At step S911, the storage scheduler 205 writes into the (6) data size of the write task table 311, the data size that is to be read (step S911) and allocates the corresponding task to the storage in which the object data is present (step S912). The storage scheduler 205 updates the storage access scheduling table 321 (step S913) and the process transitions to the process of the task scheduler 206 (FIG. 10).

If the task is other than a read task of the category A, B, or E at step S904 (step S904: NO), the storage scheduler 205 determines whether the task is of the category F (step S914). If the task is not of the category F (step S914: NO), the type of the task is a write task of either of the remaining categories of C and D and therefore, the storage scheduler 205 estimates the storage access end time to determine the storage to be accessed and allocates the task (step S915). The storage scheduler 205 determines whether the (2) specified write area indicated in the write task table 311 is equal to the (3) write specified area (i.e., whether write-back is unnecessary) (step S916).

At step S916, if the (2) specified write area indicated in the write task table 311 is equal to the (3) write specified area (step S916: YES), the write task table 311 is updated (step S917). In this case, the (2) specified write area to the (4) write-back determination flag and the (6) data size are updated in the write task table 311. At step S916, if the (2) specified write area indicated in the write task table 311 is not equal to the (3) write specified area (step S916: NO), write-back is necessary and the storage scheduler 205 inserts an F-task into the task queue 204 (step S918) and proceeds to step S917. After execution of step S917, the storage scheduler 205 updates the storage access scheduling table 321 (step S913) and the process transitions to the process of the task scheduler 206 (FIG. 10).

At step S914, if the task is of the category F (step S914: YES), the storage scheduler 205 allocates the F-task to the storage in which the object data is present (data to be written-back is present) (step S919); updates the storage access scheduling table 321 (step S913); and transitions to the process of the task scheduler 206 (FIG. 10).

FIG. 10 is a flowchart of a process procedure executed by the task scheduler. The task scheduler 206 disposed in the master scheduler 201 is executed after the process of the storage access scheduling of the storage scheduler 205 depicted in FIG. 9.

The task scheduler 206 determines whether the corresponding task is a task of the categories A to F (step S1001) and, if the task is of the categories A to F (step S1001: YES), the task scheduler 206 determines whether a task allocated to the same storage is present in either of the task queues 204 and 214 of the CPUs 101 and 102 (step S1002). If a task allocated to the same storage is present in either of the task queues 204 and 214 of the CPUs 101 and 102 (step S1002: YES), the task scheduler 206 allocates the task to the same task queue 204 or 214 (step S1003), the process is terminated and the process of the storage scheduler 205 (FIG. 9) is returned to.

At step S1001, if the task is not of the categories A to F (step S1001: NO), or at step S1002, if a task allocated to the same storage is not present in either of the task queues 204 and 214 of the CPUs 101 and 102 (step S1002: NO), the task scheduler 206 executes normal scheduling (step S1004) and the process is terminated; and the process of the scheduler 205 (FIG. 9) is returned to.

Figure 11:
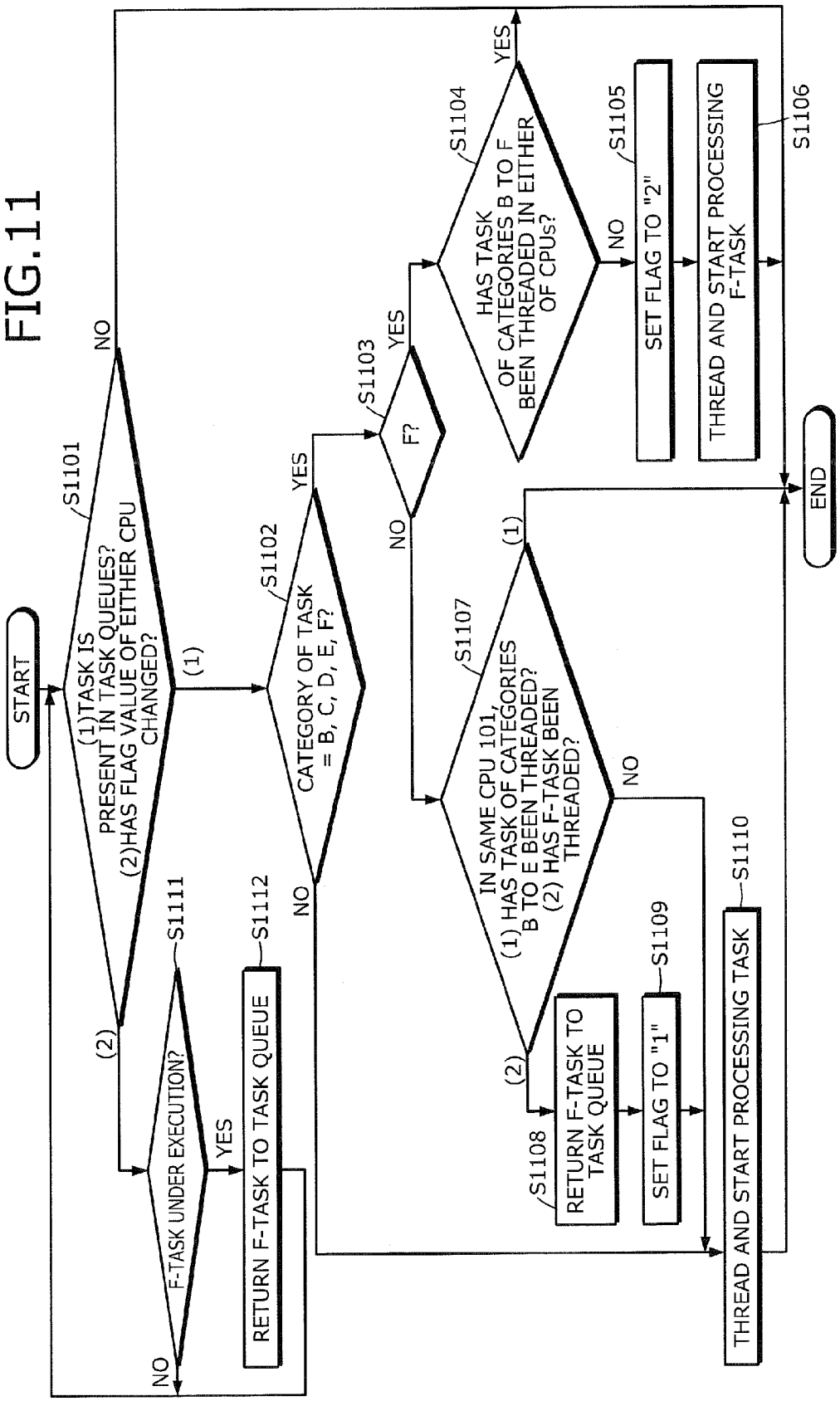
FIG. 11 is a flowchart of a process procedure executed by a master scheduler and a slave scheduler.

FIG. 11 is a flowchart of a process procedure executed by the master scheduler and the slave scheduler. First, the master scheduler 201 and the slave scheduler 211 determine whether a task is present in the task queues 204 and 214 or whether a flag value of either CPU has changed (step S1101) and, if a task is present (step S1101: result (1)), whether the task is of the categories B to F is determined (step S1102). If a flag value of either CPU has changed (step S1101: result (2)), the master scheduler and the slave scheduler determine whether an F-task is under execution (step S1111). If an F-task is under execution (step S1111: YES), the master scheduler and the slave scheduler return the F-task to the task queue (step S1112) and the process returns to step S1101. If no F-task is under execution (step S1111: NO), the process is terminated and the flow returns to step S1101. If the result at step S1101 does not correspond to either (1) or (2) (step S1101: NO), the master scheduler 201 and the slave scheduler 211 terminate the process and wait for the occurrence of a task or a change in either of the CPU flag values.

If the task is of the categories B to F at step S1102 (step S1102: YES), the master scheduler and the slave scheduler determine whether the task is of the category F (step S1103). If the task is not of the categories B to F (step S1102: NO), the process proceeds to step S1110. If the task is of the category F (step S1103: YES), the master scheduler and the slave scheduler determine whether a task of the categories B to F has been threaded in either of the CPUs 101 and 102 (step S1104). If a task of the categories B to F has been threaded (step S1104: YES), the process is terminated. On the other hand, if a task of the categories B to F has not been threaded (step S1104: NO), the master scheduler and the slave scheduler set the C-flag to "2" (step S1105) and; thread and start processing the F-task (step S1106). When the processing is completed, the process described above is terminated.

At step S1103, if the task is not of the category F (step S1103: NO), the master scheduler and the slave scheduler determine whether (1) a task of the categories B to E has been threaded, and whether (2) an F-task has been threaded, in the same CPU 101 or 102 (step S1107). If a task of the categories B to E has been threaded (step S1107: result (1)), the process is terminated. If (2) an F-task has been threaded (step S1107: result (2)), the master scheduler and the slave scheduler return the F-task to the task queue 214 (step S1108); set the C-flag to "1" (step S1109) and; thread and start processing the task (step S1110). When the processing is completed, a sequence of the process described above is terminated.

If neither (1) a task of the categories B to E has been threaded nor (2) an F-task has been threaded is true at step S1107 (step S1107: NO), the master scheduler and the slave scheduler thread and start processing the corresponding task at step S1110 (step S1110) and when the processing is completed, a sequence of the process described above is terminated.

Figure 12:
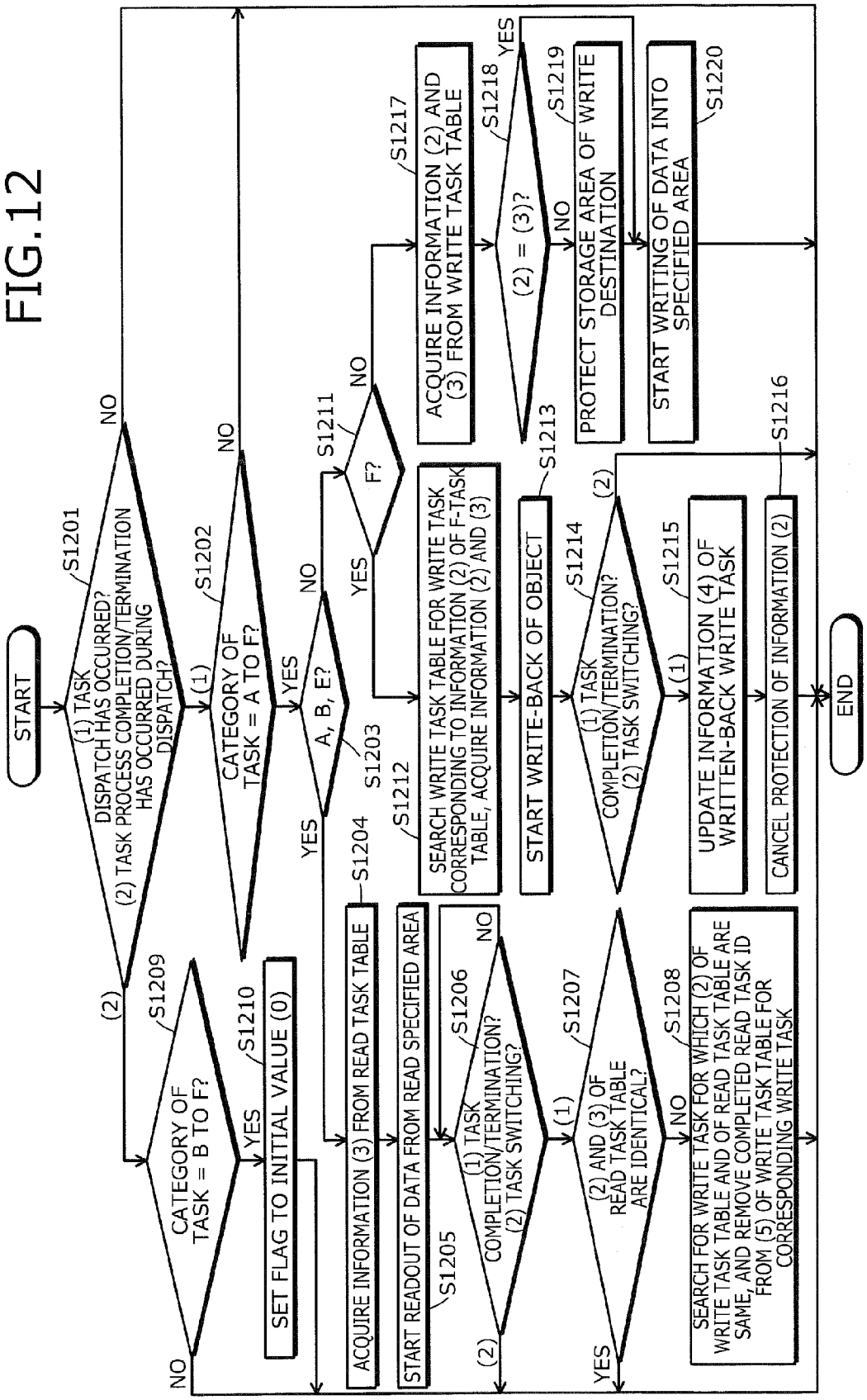
FIG. 12 is a flowchart of a process procedure executed by an access monitoring unit.

FIG. 12 is a flowchart of a process procedure executed by the access monitoring unit. When read or write occurs with respect to storage, each of the access monitoring units 202 and 212 specifies the storage to be accessed by the task (the main storage 131 or the sub-storage 132) based on information of the task under execution.

First, the access monitoring units 202 and 212 determine whether (1) task dispatch has occurred and whether (2) task process completion/termination has occurred during dispatch (step S1201). If (1) task dispatch has occurred (step S1201: result (1)), the access monitoring units 202 and 212 determine whether the task is a task of the categories A to F (step S1202). If the task is of the categories A to F (step S1202: YES), the access monitoring units 202 and 212 determine whether the task is a read task of the category A, B, or E (step S1203). If the task does not correspond to any of the result options at steps S1201 and S1202 (step S1201: NO and step S1202: NO), the process is terminated without providing special access control for the task.

At step S1203, if the task is a read task of the category A, B, or E (step S1203: YES), the access monitoring units 202 and 212 acquire the information (3) read specified area from the read task table 312 (step S1204) and start readout of data from the read specified area (step S1205). The access monitoring units 202 and 212 determine whether (1) task completion/termination has occurred and whether (2) task switching of the task has occurred (step S1206). In the case of (1) task completion/termination (step S1206: result (1)), the process proceeds to step S1207, while in the case of (2) task switching (step S1206: result (2)), the process is terminated. If neither (1) task completion/termination nor (2) task switching has occurred, the access monitoring units 202 and 212 await the occurrence of task completion/termination or task switching (step S1206: NO).

At step S1207, the access monitoring units 202 and 212 determine whether the (2) specified access area of the read task table 312 is identical to the (3) read specified area. If the (2) specified access area is identical to the (3) read specified area (step S1207: YES), the process is terminated and if the (2) specified access area is not identical to the (3) read specified area (step S1207: NO), the data has been read from a temporary storage destination and therefore, the access monitoring units 202 and 212 search for a write task that has the (2) specified write area of the write task table 311 and identical to the (2) specified access area of the read task table 312, and remove the ID of the terminated read task from the (5) temporary storage destination access read task of the write task table 311 for the corresponding write task (step S1208), and the process is terminated.

If the (2) task process completion/termination during dispatch occurs at step S1201 (step S1201: result (2)), the access monitoring units 202 and 212 determine whether the task is of the categories B to F (step S1209) and, if the task is of the categories B to F (step S1209: YES), the access monitoring units 202 and 212 set the C-flag to the initial value (0) (step S1210) and the process is terminated. On the other hand, if the task is not of the categories B to F (including the case of the task of the category A) (step S1209: NO), the process is terminated without execution.

If the task is other than a read task of the category A, B, or E at step S1203 (step S1203: NO), the access monitoring units 202 and 212 determine whether the task is a write task or an F-task (step S1211). If the task is an F-task (step S1211: YES), the access monitoring units 202 and 212 search the write task table 311 for a write task corresponding to the information (2) write-back write task ID of the F-task table 313, acquire the information (2) specified write area and (3) write specified area of the corresponding task (step S1212), and start the write-back of the object area (step S1213).

The access monitoring units 202 and 212 determine whether (1) task completion/termination or (2) task switching of this task has occurred (step S1214). In the case of (1) task completion/termination (step S1214: result (1)), the access monitoring units 202 and 212 update the information (4) write-back determination flag of the written-back write task (terminated) (step S1215), and cancel the protection of the information (2) specified write area in the write task table 311 (step S1216), ending the process. In the case of (2) task switch at step S1214 (step S1214: result (2)), the process is terminated without execution.

At step S1211, if the task is not an F-task (step S1211: NO), the task is a write task of the category C or D and the access monitoring units 202 and 212 acquire the information (2) specified write area and (3) write specified area from the write task table 311 (step S1217). The access monitoring units 202 and 212 determine whether the (2) specified write area is identical to the (3) write specified area (step S1218). If the areas are not identical (step S1218: NO), the access monitoring units 202 and 212 protect the storage area of the write destination (step S1219); start the writing of data into the specified area (step S1220); and when this process is completed, terminate a sequence of the process described above is terminated. If the (2) specified write area is identical to the (3) write specified area at step S1218 (step S1218: YES), the access monitoring units 202 and 212 skip step S1219 and start the writing of data into the specified area (step S1220). When this process is completed, a sequence of the process described above is terminated.

Figure 13:
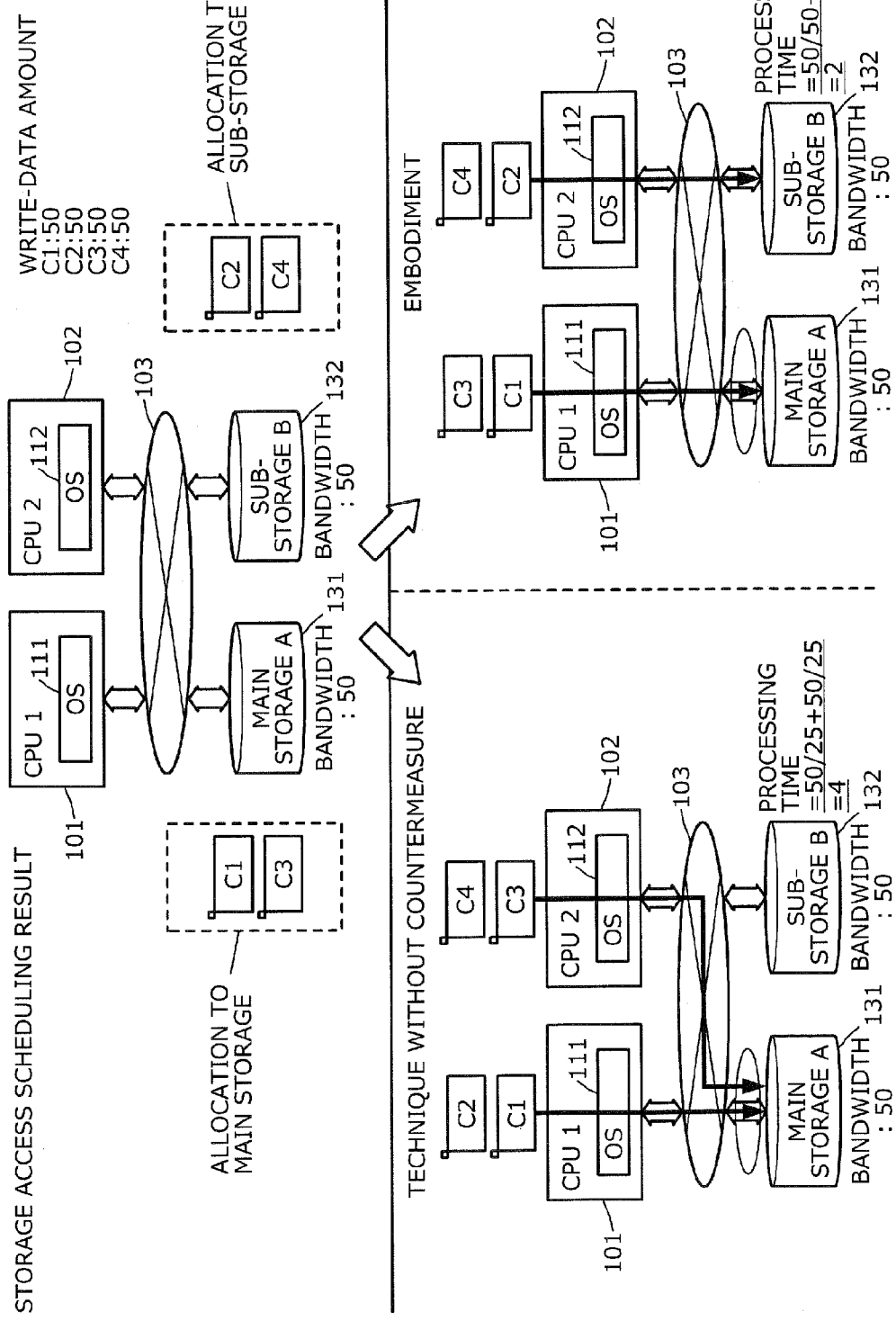
FIG. 13 is a diagram for explaining contention prevention and a processing time of all accesses according to the embodiment.

FIG. 13 is a diagram for explaining contention prevention and a processing time of all the accesses according to the embodiment. It is assumed that as a result of the storage access scheduling described above, write tasks C1 and C3 of the category C are allocated to the main storage 131 while write tasks C2 and C4 of the category C are allocated to the sub-storage 132. It is assumed that each of the tasks C1 to C4 has a write-data amount of 50 and that each of the storages has a bandwidth of 50.

According to the process of the embodiment (the right side of FIG. 13), since the tasks having the same access destinations are allocated to the same CPUs 101 and 102, no access contention occurs for either the main storage 131 or the sub-storage 132. Assuming that sequential access is performed for each of the CPUs 101 and 102, the processing time of all the accesses is 50/50+50/50=2. Therefore, the entire bandwidths of the main storage 131 and the sub-storage 132 can be used efficiently.

On the other hand, the left side of FIG. 13 depicts a configuration of a conventional technique without countermeasure having the basic system configuration same as the embodiment, i.e., a configuration in which only the storage access schedule is performed without coordination between the storage access scheduling and the task scheduling for comparison. In this case, as depicted in FIG. 13, the tasks C1 and C2 are allocated to the CPU 101 and the tasks C3 and C4 are allocated to the CPU 120 in some cases. When the tasks are scheduled in this way, if the task C1 of the CPU 101 and the task C3 of the CPU 102 are executed for the tasks C1 and C3 allocated to the main storage 131, the CPUs 101 and 102 access the main storage 131 at the same time, resulting in access contention. Assuming that sequential access is performed by each of the CPUs 101 and 102, because of the occurrence of access contention due to execution of the tasks C1 and C3 and the access contention at the time of the tasks C2 and C4, the processing time of all the accesses is 50/25+50/25=4, which is twice as long as the processing time of the embodiment. As can be seen from this example, the process of the embodiment can achieve higher access performance.

Figure 14:
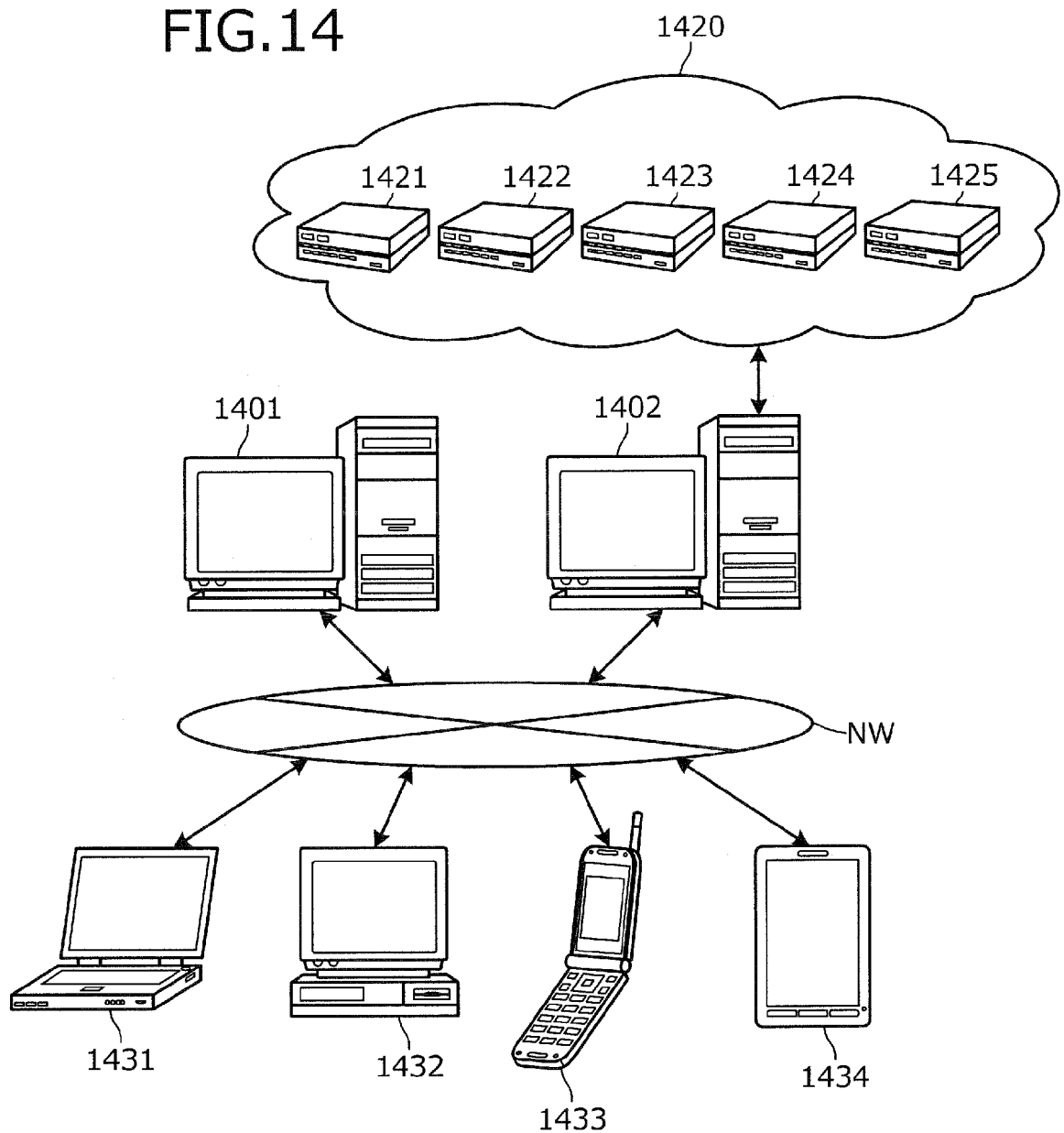
FIG. 14 is a diagram of an application example of the system using a computer depicted in FIG. 1.

FIG. 14 is a diagram of an application example of the system using the computer depicted in FIG. 1. In FIG. 14, a network NW is a network enabling communication between servers 1401 and 1402 and clients 1431 to 1434 and is made up of a local area network (LAN), a wide area network (WAN), the Internet, and a mobile telephone network, for example.

The server 1402 is a management server of a server group (servers 1421 to 1425) making up a cloud 1420. The clients 1431 to 1434 include the client 1431 that is a notebook personal computer, the client 1432 that is a desktop personal computer, the client 1433 that is a mobile telephone (may be a smartphone, personal handyphone system (PHS), and the like), and the client 1434 that is a tablet terminal. The servers 1401, 1402, 1421 to 1425, and the clients 1431 to 1434 are implemented by, for example, computers such as that depicted in FIG. 1.

This embodiment is also applicable to a configuration in which the CPUs 101, 102 and the storage 131, 132 depicted in FIG. 1 are equipped on respective computers (e.g., the mobile telephone and the servers of FIG. 14) such that multiple computers execute distributed parallel processing via the network NW.

According to the technique described above, by allocating to the same CPU, tasks that access the same storage, access contention by multiple CPUs for one storage can be prevented, enabling effective scheduling to be performed.

Types of tasks are determined to avoid the access contention occurring when another task is generated for the storage being accessed by a certain task. With regard to the types of tasks, tasks of multiple types may respectively be classified based on a processing time according to a data size, etc. and if access contention momentarily occurs and has no effect on overall access time, a determination is made to allow the access contention. For example, in the case of a read task utilizing only a constant bandwidth instead of the entire bandwidth, another write task, etc. may be allowed to access the same storage in parallel.

Since the data writing destination storage of a write task is determined based on times when multiple tasks access respective storages, the access time can be reduced. This determination is made by using multiple values such as bandwidths of storages and data amounts of classified tasks so that suitable storage can be determined.

While one CPU executes a read task with the storage determined as a data readout destination, if a write task is executed by a different CPU, the data of the write task is written into different storage and then transferred to the original storage after the access of the storage has been completed. As a result, the access process for storage of the entire system can be made more efficient.

Although the storages described in the embodiments are, for example, disk apparatuses, this is not a limitation and the embodiments are applicable in the same way to various other data memory apparatuses for which access contention occurs when the memory is shared and used by multiple CPUs.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduling method that causes a scheduler to execute a process comprising:
    first determining, for each execution of a task by one of a plurality of central processing units (CPUs), a task category of the task based on a type of access to a memory device and a utilized bandwidth;
    scheduling the task to access one of a plurality of memory devices, based on the task category and an estimated access end time of the task;
    allocating, based on a result of the scheduling the task, a plurality of tasks that access a same memory device to a same CPU;
    second determining whether the task belongs to a first task category;
    third determining whether a first access area accessed by the task is located in a first memory or a second memory, when the task belongs to the first task category; and
    setting, when the task is included in a third task category, a memory accessed by the task to the first memory or the second memory based on a result of comparison between a first access time when the task accesses the first memory and a second access time when the task accesses the second memory.

2. The scheduling method according to claim 1, wherein the first task category is a memory read task.

3. The scheduling method according to claim 1, wherein the second determining includes determining whether the task belongs to a second task category, when the task does not belong to the first task category.

4. The scheduling method according to claim 3, wherein the second task category is a memory read/write task.

5. The scheduling method according to claim 1, wherein the third determining includes determining whether the first access area is included in a second access area accessed by a task belonging to a third task category, and the third determining includes determining whether the first access area is located in the first memory or the second memory, based on a result at the third determining whether the first access area is included in the second access area.

6. The scheduling method according to claim 1, wherein the setting, when the first access area is included in the second access area, includes setting the memory accessed by the task to the first memory or the second memory, based on completion of writing of the second access area from the second memory to the first memory.

7. The scheduling method according to claim 1, wherein the third task category is a memory write task.

8. The scheduling method according to claim 1, the process further comprising
writing into the first memory, a memory area of the second memory accessed by the task, when the memory accessed by the task is set to the second memory.

9. The scheduling method according to claim 1, the process further comprising
allocating a given task included in a first task category group to a second CPU to which another task that accesses the first memory belongs, when the task is included in the first task category group.

10. The scheduling method according to claim 1, the process further comprising
returning a given task under execution by a second CPU to a task queue of the second CPU, when a task allocated to the second CPU does not belong to a second task category and the given task belongs to the second task category.

11. The scheduling method according to claim 1, the process further comprising
terminating execution of a subsequent task belonging to a second task category, when a task allocated to a second CPU belongs to the second task category and a task included in a first task category group is not executed by at least one CPU among a plurality of CPUs including the second CPU.

12. A system comprising a plurality of central processing units (CPUs) and a plurality of memory devices, wherein the system is configured to:
determine, for each execution of a task by one of the CPUs, a task category of the task based on a type of access to a memory device and a utilized bandwidth;
schedule the task to access one of the memory devices, based on the task category and an estimated access end time of the task;
allocate, based on a result of the scheduling, a plurality of tasks that access a same memory device to a same CPU;
determine whether the task belongs to a first task category;
determine whether a first access area accessed by the task is located in a first memory or a second memory, when the task belongs to the first task category; and
set, when the task is included in a third task category, a memory accessed by the task to the first memory or the second memory based on a result of comparison between a first access time when the task accesses the first memory and a second access time when the task accesses the second memory.

* * * * *